(12) United States Patent
Guazzoni

(10) Patent No.: US 10,675,780 B2
(45) Date of Patent: Jun. 9, 2020

(54) MACHINE FOR MACHINING SLABS

(71) Applicant: GMM S.P.A., Gravellona Toce (IT)

(72) Inventor: Luigi Guazzoni, Gravellona Toce (IT)

(73) Assignee: GMM S.P.A., Gravellona Toce (IT)

(*) Notice: Subject to any disclaimer, the term of this patent is extended or adjusted under 35 U.S.C. 154(b) by 33 days.

(21) Appl. No.: 15/568,001

(22) PCT Filed: Apr. 21, 2016

(86) PCT No.: PCT/IB2016/052281
§ 371 (c)(1),
(2) Date: Oct. 20, 2017

(87) PCT Pub. No.: WO2016/170502
PCT Pub. Date: Oct. 27, 2016

(65) Prior Publication Data
US 2018/0104850 A1 Apr. 19, 2018

(30) Foreign Application Priority Data
Apr. 22, 2015 (IT) .............................. MI2015A0580

(51) Int. Cl.
*B28D 1/04* (2006.01)
*B23D 45/14* (2006.01)
(Continued)

(52) U.S. Cl.
CPC ........... *B28D 1/043* (2013.01); *B23D 45/143* (2013.01); *B28D 1/003* (2013.01); *B23D 45/02* (2013.01);
(Continued)

(58) Field of Classification Search
CPC .......... B28D 1/043; B28D 1/003; B28D 1/04; B28D 1/048; B28D 1/20; B28D 1/22;
(Continued)

(56) References Cited

U.S. PATENT DOCUMENTS 3,491,805 A   1/1970 Riedener
6,988,434 B1 * 1/2006 Jiao ...................... B23Q 1/4866
                                                              451/11
(Continued)

FOREIGN PATENT DOCUMENTS

CN   202336894 U   7/2012
CN   203062837 U   7/2013
(Continued)

OTHER PUBLICATIONS

Office Action dated Nov. 28, 2019 for CN Application No. 201680023355.X.
Office Action dated Jul. 24, 2019 for CN 201680023355.X.

*Primary Examiner* — Orlando E Aviles
*Assistant Examiner* — Robert F Neibaur
(74) *Attorney, Agent, or Firm* — Clayton, McKay & Bailey, PC

(57) ABSTRACT

A machine (1) for machining slab materials (3) is described, comprising: a working plane (2) configured to support a slab material (3) to be machined; a first tool-holder electrospindle (11) associated to a respective supporting body (33), the first electrospindle (11) and the respective supporting body (33) being supported above said working plane (2) by a respective supporting equipment (12) perpendicularly with respect to the working plane (2) and configured to move the first electrospindle (11) and the respective supporting body (33) about a rotation axis (Z) perpendicular to the working plane (2); a moving apparatus (14) configured to move the equipment (12) in parallel to the working plane (2) and along directions (X, Y) perpendicular to one another; at least a second tool-holder electrospindle (45), rotationally and translationally integral with the first electrospindle (11), supported above the working plane (2) in parallel to the first electrospindle (11) by a respective supporting arm (47) slidably supported by the supporting body (33) of the first (Continued)

electrospindle (11); a first actuator device (55) active to move the supporting arm (47) and the second electrospindle (45) supported by the same towards and away from the first electrospindle (11) in parallel to the working plane (2) and along a direction substantially perpendicular to a cutting plane extending perpendicularly to the working plane (2); and a second actuator device (63) associated to the supporting arm (47) of the second electrospindle (45) and configured to move the second electrospindle (45) along a direction perpendicular to the working plane (2) independently of the first electrospindle (11).

25 Claims, 7 Drawing Sheets

(51) Int. Cl.
<table>
<tr><td>B28D 1/00</td><td>(2006.01)</td></tr>
<tr><td>B23D 45/10</td><td>(2006.01)</td></tr>
<tr><td>B23D 45/02</td><td>(2006.01)</td></tr>
<tr><td>B28D 1/20</td><td>(2006.01)</td></tr>
<tr><td>B23D 47/08</td><td>(2006.01)</td></tr>
<tr><td>B23D 47/12</td><td>(2006.01)</td></tr>
</table>

(52) U.S. Cl.
 CPC ............ *B23D 45/028* (2013.01); *B23D 45/10* (2013.01); *B23D 47/08* (2013.01); *B23D 47/12* (2013.01); *B28D 1/04* (2013.01); *B28D 1/20* (2013.01)

(58) Field of Classification Search
 CPC ........ B28D 7/04; B23D 45/143; B23D 45/10; B23D 45/02; B23D 45/028; B23D 47/08; B23D 47/12; B23D 47/02; B23D 47/025; B24B 27/0015; B24B 27/046; B24B 27/0076; B24B 41/02; B24B 41/04; B24B 41/047
 USPC ............ 125/15, 16.04, 28, 38, 11.18, 13.01; 451/41, 5, 8, 9, 10, 362, 65–74
 See application file for complete search history.

(56) References Cited

U.S. PATENT DOCUMENTS

<table>
<tr><td>7,810,482 B2 *</td><td>10/2010</td><td>Gifford</td><td>B23D 47/02<br>125/13.01</td></tr>
<tr><td>7,823,575 B2 *</td><td>11/2010</td><td>O'Banion</td><td>B23D 45/02<br>125/13.01</td></tr>
<tr><td>9,233,428 B2 *</td><td>1/2016</td><td>Williams</td><td>B24B 27/0076</td></tr>
<tr><td>9,409,242 B2 *</td><td>8/2016</td><td>Guazzoni</td><td>B23D 45/027</td></tr>
<tr><td>2009/0272243 A1 *</td><td>11/2009</td><td>Desrosiers</td><td>B23D 45/062<br>83/471.2</td></tr>
<tr><td>2013/0055550 A1</td><td>3/2013</td><td>Guazzoni</td><td></td></tr>
<tr><td>2013/0239942 A1 *</td><td>9/2013</td><td>Guazzoni</td><td>B28D 1/043<br>125/35</td></tr>
<tr><td>2014/0309784 A1</td><td>10/2014</td><td>Toncelli</td><td></td></tr>
</table>

FOREIGN PATENT DOCUMENTS

<table>
<tr><td>CN</td><td>103350459 A</td><td>10/2013</td><td></td></tr>
<tr><td>CN</td><td>203401613 U</td><td>1/2014</td><td></td></tr>
<tr><td>CN</td><td>204094857 U</td><td>1/2015</td><td></td></tr>
<tr><td>CN</td><td>204195805 U</td><td>3/2015</td><td></td></tr>
<tr><td>CN</td><td>103203766 A</td><td>7/2015</td><td></td></tr>
<tr><td>DE</td><td>2700386</td><td>7/1978</td><td></td></tr>
<tr><td>DE</td><td>202009006030 U1</td><td>7/2009</td><td></td></tr>
<tr><td>DE</td><td>102009022784 A1 *</td><td>11/2010</td><td>........... B23D 45/027</td></tr>
<tr><td>DE</td><td>102009025356 A1</td><td>12/2010</td><td></td></tr>
<tr><td>EP</td><td>1402980</td><td>3/2004</td><td></td></tr>
<tr><td>EP</td><td>2253422 A1</td><td>11/2010</td><td></td></tr>
<tr><td>EP</td><td>2983879 A1 *</td><td>2/2016</td><td>............. B28D 1/003</td></tr>
<tr><td>IT</td><td>1247180</td><td>12/1994</td><td></td></tr>
<tr><td>WO</td><td>WO2014207723 A1</td><td>12/2013</td><td></td></tr>
<tr><td>WO</td><td>WO 2014207723</td><td>12/2014</td><td></td></tr>
</table>

* cited by examiner

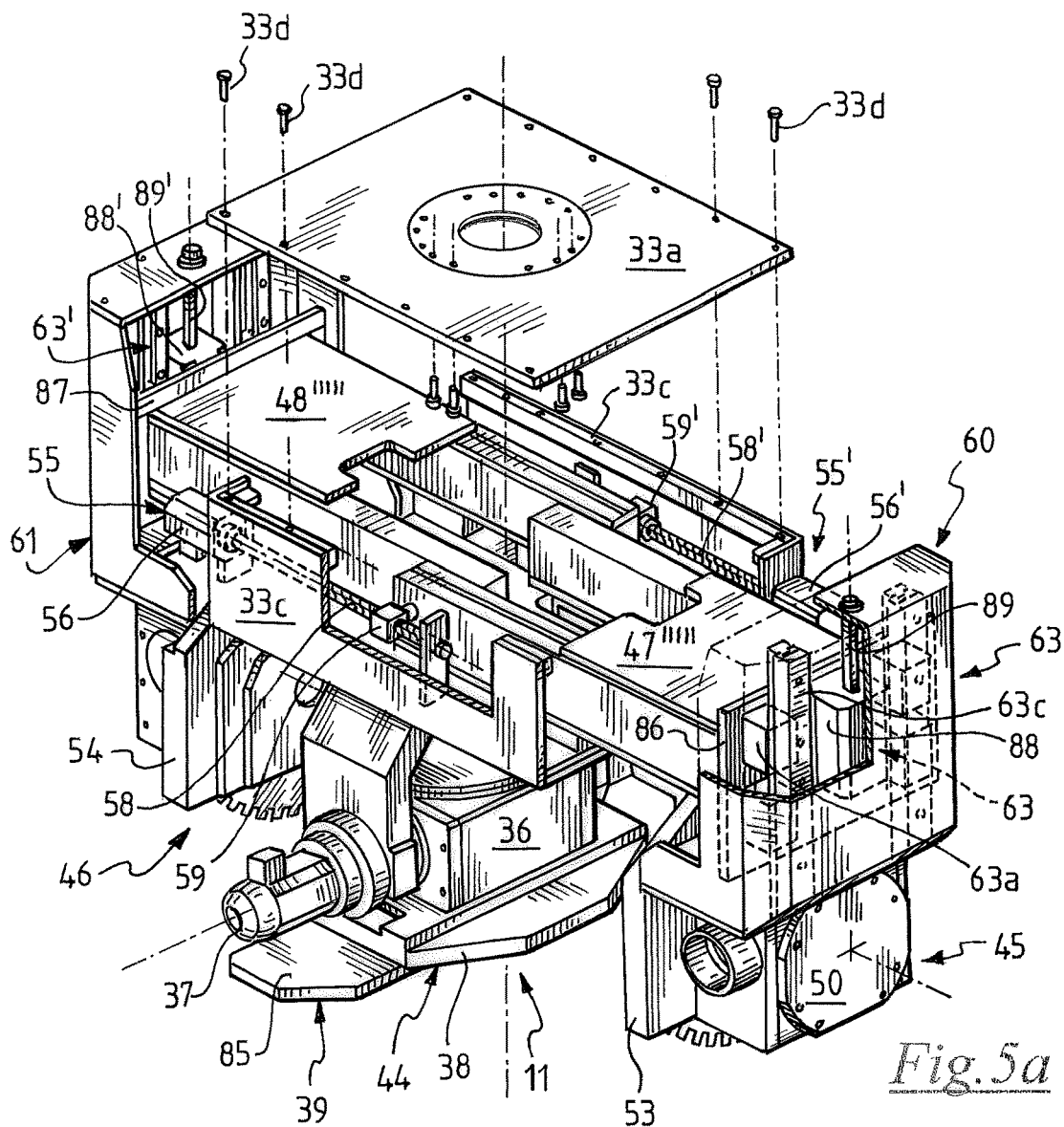
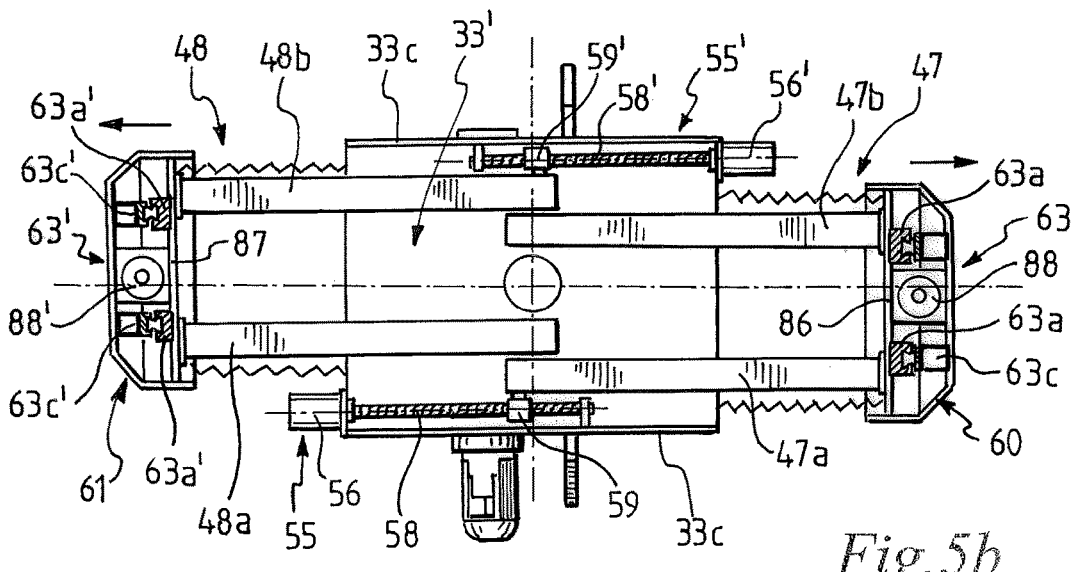
Fig.5a
Fig.5b

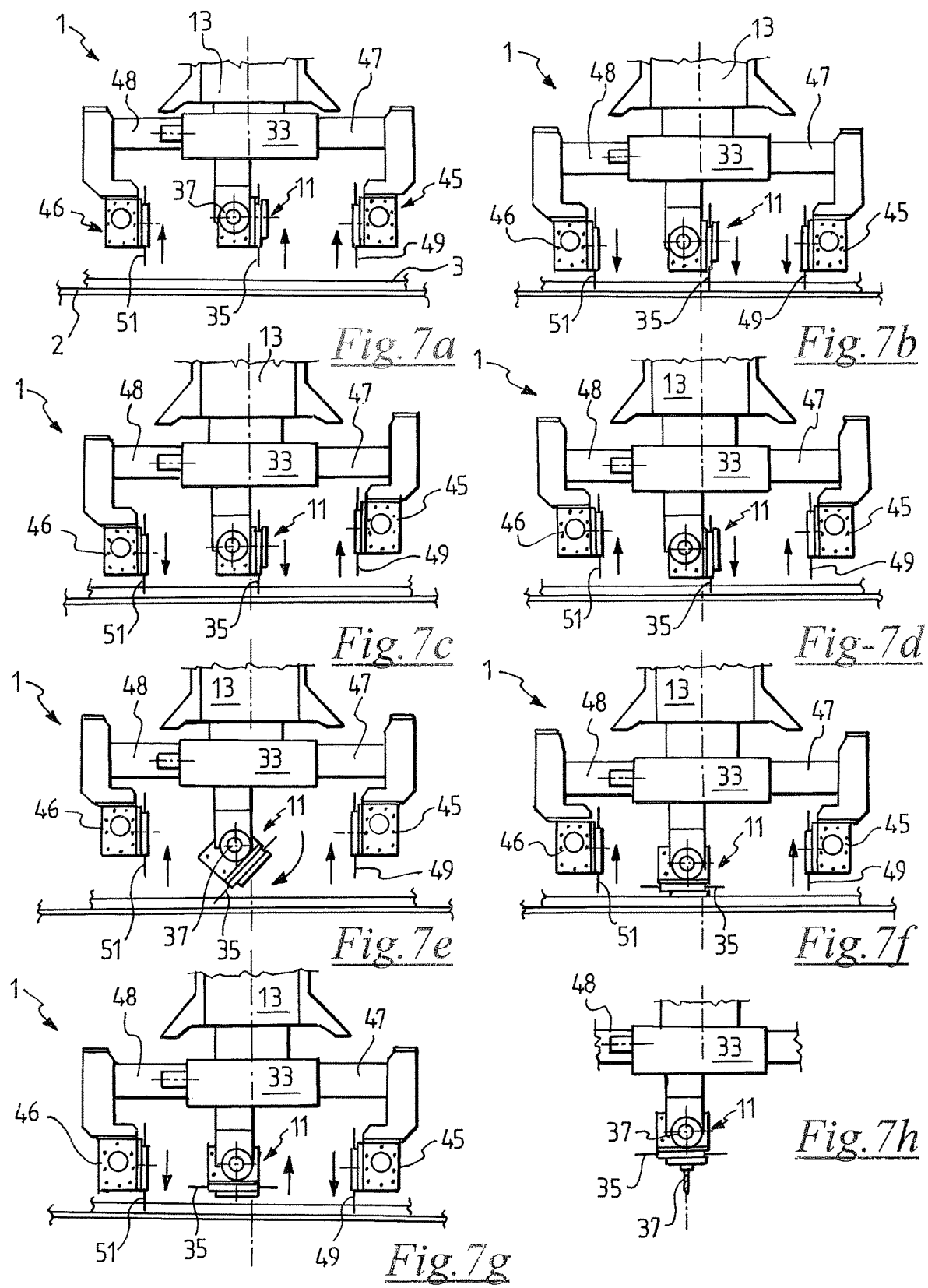

MACHINE FOR MACHINING SLABS

This application is a United States national phase filing of PCT/IB2016/052281, filed Apr. 21, 2016, which claims priority to MI2015A000580, filed Apr. 22, 2015, both of which are hereby incorporated by reference herein in their entireties.

BACKGROUND OF THE INVENTION

The present invention relates to a machine for machining slab materials, in particular, but not exclusively, stone materials, such as, for example, marbles and granites.

The term "machining" is used herein to generically indicate any operation carried out on a piece of material, such as for example cutting, drilling, squaring or shaping.

PRIOR ART

The machines for machining slab materials, and in particular stone materials, essentially comprise:
- a working plane configured to support a slab material to be machined,
- a tool-holder electrospindle to which a machining tool is associated, for example a cutting disc or a milling cutter, supported above said working plane by a respective supporting equipment movable perpendicularly to the working plane and configured to move the electrospindle about a rotation axis perpendicular to the working plane;
- a moving apparatus configured to move the electrospindle and the respective supporting equipment in parallel to the working plane; and
- an operation and control unit equipped with a suitable operator interface.

A plurality of supply lines, for example electrical supply lines and/or lines for transporting a cooling fluid at the machining tool, are connected to the electrospindle.

More specifically, the moving apparatus of the electrospindle and of the respective supporting equipment comprises a horizontal bridge that rests on walls or other vertical supporting structures and driving devices configured to move the electrospindle and the respective supporting equipment along the bridge and to move the bridge on the respective vertical supporting structures.

In this way, the electrospindle and the respective supporting equipment can be moved in parallel to the working plane along two directions perpendicular to each other. The supporting equipment of the electrospindle comprises in turn a first actuator device configured to move the equipment and the electrospindle supported by the same along an additional moving direction perpendicular to the working plane.

In order to carry out machining operations along moving directions parallel to the working plane and perpendicular to one another, as well as along oblique directions, it is also foreseen to rotate the electrospindle about a vertical axis, so as to have the piece of material being machined positioned according to different angles with respect to the machining tool.

To this end, the supporting equipment of the electrospindle comprises a second actuator device configured to rotate the electrospindle about such a vertical axis.

In recent times and for large-scale production of pieces of standard dimensions, such as for example tiles, skirtings or kitchen counters, there has been an increasing need of enhancing the productivity of machines for machining slab materials in particular of those machines—commonly known as saw machines—specifically used for cutting slabs.

To this end, it has been proposed to carry out the cutting of a plurality slabs, stacked on each other as a pack and arranged on the working plane of the machine, by using cutting discs having a suitably increased diameter with respect to those commonly used for cutting a single slab.

The cutting of stacked slabs, however, has the drawback that as the diameter of the cutting disc increases, as would be desirable to enhance the productivity of the machine, the cutting precision is also reduced. This, due to the fact that the cutting disc is constituted by a very thin metallic disc (generally 3-5 mm thick) which tends to bend along the cutting plane due to the stresses which the disc is subjected to during the cutting operations, with the result that the pieces obtained from the top slab of the pack practically never have exactly the same dimensions (as required) as those of the pieces obtained from the slabs below.

The compromise reached in practice thus consists of using cutting discs having a smaller diameter than the maximum desirable in combination with locking flanges to reduce the flexibility of the discs, all this however at the expense of the machine productivity which is not totally satisfactory for large-scale productions of standard pieces.

As an alternative to the cutting of a plurality of slabs stacked on each other as a pack, it has also been proposed in the prior art, such as for example described in International patent application WO 2014/207723, to use machines for cutting slabs provided with a plurality of tool-holder heads each consisting of a cutting disc driven by a respective driving motor.

The tool-holder heads are supported in parallel to each other by a supporting beam extending in parallel to the working plane and kept at a predetermined and constant distance from the working plane by a respective supporting and moving apparatus, which will be discussed further hereinafter, to which the supporting beam is hung.

In this known machine configuration, the supporting beam is therefore not vertically movable, whereas the tool-holder heads supported by the beam are movably guided along such a beam both perpendicularly to the working plane and horizontally towards and away from each other by means of respective actuator devices. In particular, the tool-holder heads are removably mounted in a sliding manner on guide means associated to a lateral face of the supporting beam.

By means of this machine and thanks to the presence of a plurality of tool-holder heads arranged in parallel to each other it is possible to carry out simultaneous cuts by bringing the cutting discs of each group into engagement with the starting slab so as to simultaneously obtain a plurality of pieces of standard dimensions from a single slab arranged on the working plane.

In order to move the slab to be cut and the pieces obtained therefrom, moreover, these known cutting machines may be provided with one or more suction-type manipulator groups integrally mounted to the supporting beam at a side opposite with respect to the tool-holder heads.

In particular, such a manipulator group comprises a plurality of plates provided with suction-type means for picking up the pieces, each plate being moved along the vertical direction by a respective dedicated actuator device which has the function of bringing the suction-type means into a lower position with respect to each cutting disc so as to be able to pick up the machined piece or the piece to be machined.

As outlined above, finally, such cutting machines are provided with a supporting and moving apparatus of the supporting beam of the tool-holder heads, said apparatus being arranged above such a beam and being configured to move, in parallel to the working plane along the aforementioned directions perpendicular to one another, the supporting beam and the elements supported by the same, that is, the tool-holder heads on one side and, if present, the suction-type manipulator group on the other side.

Lastly, such a supporting and moving apparatus comprises an additional moving group of the supporting beam and of the elements supported by the same about a vertical axis perpendicular to the working plane, a horizontal bridge which rests on vertical supporting structures and actuator devices configured to move the moving group of the supporting beam along the bridge and the bridge along a runway perpendicularly supported to the bridge by the vertical supporting structures.

By means of these machines and thanks to the presence of a plurality of tool-holder heads arranged in parallel to each other it is possible to carry out simultaneous cuts by bringing the cutting discs of each group into engagement with the starting slab so as to simultaneously obtain a plurality of pieces of standard dimensions from a single slab arranged on the working plane.

SUMMARY OF THE INVENTION

The Applicant has found that the aforementioned machines provided with a plurality of tool-holder heads arranged in parallel to each other, even if they meet the need of enhancing the productivity of large-scale cutting operations of standard pieces, do have however some drawbacks that are not easy to solve.

A first drawback is linked to the substantial complexity and to the cost of the machine, which requires:
  motors of suitable dimensions to rotate the supporting beam and the elements supported by the same (the cutting discs, the respective driving motors, the plates with the suction-type means and the respective dedicated actuator devices),
  suitable and separated actuator devices to move each of the tool-holder heads with the respective driving motors along the vertical direction;
  suitable actuator devices to move each tool-holder head with the respective driving motors towards/away from each other along a horizontal direction; and
  suitable dedicated actuator devices to vertically move the plates with the suction means of the manipulator group of the slabs.

A second drawback is linked to the fact that it is impossible to make horizontal cuts in the thickness of the slab with any of the cutting discs, where required: in such known machines, in fact, it is possible to carry out inclined cuts with respect to the vertical only up to a maximum of about 47° for example using one of the tool-holder heads. This is due to the size of the other tool-holder heads which prevent greater inclinations.

The structure of the tool-holder heads and the limited ability to tilt the same with respect to the vertical direction implies that whenever it is desired to use working tools different from the cutting discs, such as for example milling cutters or grinders, it is necessary to replace the entire tool-holder head (tool-holder and the respective driving motor) with the complications which follow and with an increase in the machine downtime.

A third drawback is linked to possible difficulties in ensuring a precise angular positioning of the supporting beam and of the elements supported by the same over a period of time due to the high masses involved and the relatively high forces of inertia which develop during the rotation about the vertical axis of such a beam and of the elements supported by the same and which may cause, in the long term, a premature wearing of the motion transmission elements, for example of the gears of a geared motor, present in the moving group of the supporting beam about the vertical axis.

These premature wearing phenomena, moreover, can be further increased by the torsion stresses which the aforementioned motion transmission elements are subjected to in case of oblique cuts due to the torque that develops in case of use of at least one disc spaced with respect to a fulcrum represented by the vertical axis passing through the centre of the moving group of the supporting beam.

Lastly, a further drawback is linked to the relatively large distance between the horizontal bridge of the supporting and moving apparatus of the supporting beam of the tool-holder heads and the cutting line, a distance which may jeopardise the cutting precision.

The technical problem underlying the present invention is therefore that of simplifying the machines for machining slab materials provided with a plurality of cutting groups arranged in parallel to one another, at least partially overcoming the drawbacks described above.

In particular, the invention aims at providing a machine for machining slab materials having a high productivity, comprising a plurality of cutting blades arranged in parallel to one another, for example for a large-scale production of pieces of standard dimensions, which, however, is at the same time very simple, low-cost and which allows to maintain the cutting precision over time. The invention therefore relates, in a first aspect thereof, to a machine for machining slab materials according to claim 1.

In particular, the invention relates to a machine for machining block or slab materials comprising:
  a working plane configured to support a slab material to be machined;
  a first tool-holder electrospindle associated to a respective supporting body, the first electrospindle and the respective supporting body being supported above said working plane by a respective supporting equipment perpendicularly movable with respect to the working plane and configured to move the first electrospindle and the respective supporting body about a rotation axis perpendicular to the working plane;
  a moving apparatus configured to move the supporting equipment in parallel to the working plane and along directions perpendicular to one another;
  at least a second tool-holder electrospindle, rotationally and translationally integral with the first electrospindle, supported above said working plane in parallel to the first electrospindle by a respective supporting arm slidably supported by the supporting body of the first electrospindle;
  a first actuator device configured to act on the supporting arm of the second electrospindle to move said supporting arm and said at least a second electrospindle supported by the same towards and away from said first electrospindle in parallel to said working plane and along a direction substantially perpendicular to a cutting plane extending perpendicularly to the working plane; and a second actuator device associated to said supporting arm of said at least a second electrospindle and configured to move said at least a second electrospindle along a direction perpendicular to the working plane independently of the first electrospindle.

Advantageously, the machine according to the present invention allows to achieve the desired structural simplification and the desired cost reduction with respect to the known high-productivity machines for cutting slabs described above, by using the supporting equipment of the first electrospindle and of the respective supporting body to simultaneously move all the electrospindles of the machine in parallel to the working plane, perpendicularly to the working plane and about a rotation axis perpendicular to the working plane.

And, this, as happens in a conventional machine provided with a single electrospindle.

In its operative cutting configuration of a single slab, therefore, the machine of the invention has a plurality of electrospindles in parallel to each another and having a horizontal axis, in other words parallel to the working plane, which rotate respective blades or cutting discs about said horizontal axis according to as many cutting planes extending perpendicularly to the working plane.

In the following description and in the subsequent claims, the term "cutting plane" is used to indicate the laying plane of the cutting disc.

In the following description and in the subsequent claims and in accordance with conventional terminology in the art, the moving directions (or axes) parallel to the working plane will also be called directions or axes X and Y, the moving direction (or axis) perpendicular to the working plane will also be called direction or axis Z and the moving direction (or axis) about the axis Z will also called direction or axis W.

In the following description and in the subsequent claims, the terms "horizontal", "vertical", "oblique", "inclined", "upper", "lower", and so forth when referring to the machine or to parts thereof, are intended to be referred to the working configuration of the machine.

In view of the above, it is thus clear that the machine of the invention not only achieves the desired structural simplification and the desired reduction of costs, but it is also controllable in an equally simple manner since it allows to use the same system of coordinates X, Y, Z and W of a conventional machine provided with a single electrospindle for moving a cutting group comprising a plurality of electrospindles (hereinafter referred to for brevity: multi-spindle cutting unit) within a predetermined cutting volume.

The mechanical configuration of the machine according to the invention, in fact, provides for the support of all the tool-holder electrospindles by means of the supporting body of the first electrospindle, supported in turn above said working plane only by the supporting equipment of the first electrospindle, an element which is already present in a conventional machine provided with a single electrospindle.

Advantageously, the supporting body of the first electrospindle slidably supports the supporting arm of at least a second electrospindle, so as to achieve a multi-spindle cutting unit that is very compact and formed by electrospindles rotationally integral with each other about the axis Z and translationally integral above the working plane along the directions X and Y perpendicular to one another and also integrally movable towards and away from the working plane (direction Z).

In this way, it is thus advantageously possible to exploit moving elements already present in a conventional machine provided with a single electrospindle to address in a predetermined cutting volume the multi-spindle cutting unit.

Advantageously, moreover, the multi-spindle cutting unit of the machine according to the invention does not require separate and additional handling devices of the first tool-holder electrospindle in the horizontal direction along the supporting beam and in the vertical direction towards the working plane as required by the machine described in International patent application WO 2014/207723, in which all the electrospindles are provided with their own separate moving means along those directions.

The machine according to the present invention can have at least one of the following preferred features; these can in particular be combined with one another as desired in order to satisfy specific application requirements.

Preferably, the machine comprises an operation and control unit equipped with a suitable operator interface.

Preferably, the moving apparatus configured to move the first electrospindle and the respective supporting equipment in parallel to the working plane comprises a horizontal bridge on which the supporting equipment of the first electrospindle is slidably mounted, said equipment being thus supported by the bridge perpendicularly thereto.

In this way, it is advantageously possible to reduce the distance between the horizontal bridge of the supporting equipment of the first electrospindle and of the additional electrospindles associated thereto, and the cutting line of the electrospindles, advantageously increasing the cutting precision with respect to the known high-productivity machines for cutting slabs described above.

Preferably, the first electrospindle and/or the additional electrospindle(s) associated thereto are of the direct drive type, in other words, they rotate the machining tool associated thereto, such as for example a blade or cutting disc or a milling cutter, without interposition of reducers, gears or transmissions.

In this way, it is advantageously possible both to drastically reduce the noise in the transmission of motion to the cutting discs, which are directly driven by each electrospindle, and to have a very compact motor/tool group which is not subject to undesired vibration phenomena over time.

In a preferred embodiment, the first electrospindle and/or the additional electrospindles associated thereto comprise a liquid-cooled driving motor, so as to have an element for rotating the cutting discs which has a very small size.

In this way, it is advantageously possible to carry out simultaneous cuts while maintaining the cutting discs driven by the electrospindles at a short distance, of the order of 10-30 cm, from each other.

In a particularly preferred embodiment, the machine of the invention further comprises at least a third tool-holder electrospindle, rotationally and translationally integral with the first and with the second electrospindle, supported above said working plane in parallel to the first electrospindle by a respective supporting arm slidably supported by the supporting body of the first electrospindle.

In this way, it is advantageously possible to further increase the productivity of the cutting machine achieving at the same time the advantageous technical effects mentioned above.

In a preferred embodiment, said at least a third tool-holder electrospindle is supported above the working plane at a side opposite to the second electrospindle.

In this way, it is advantageously possible to have a symmetrical arrangement of masses with respect to the supporting body of the first electrospindle, with the related benefits in terms of balance of the machine parts rotatably movable about the vertical axis Z.

Within the framework of this preferred embodiment with three electrospindles, the machine of the invention preferably comprises:

a third actuator device configured to act on the supporting arm of the third electrospindle to move said supporting arm and said third electrospindle supported by the same towards and away from said first electrospindle in parallel to the working plane and along a direction substantially perpendicular to a cutting plane extending perpendicularly to the working plane; and a fourth actuator device associated to the supporting arm of the third electrospindle and configured to move the third electrospindle along a direction perpendicular to the working plane independently of the first and optionally of the second electrospindle.

Also in this case, it is thus advantageously possible to:

achieve a compact assembly of electrospindles rotationally and translationally integral with each other above the working plane and integrally movable towards and away from the latter by using moving devices already provided in a conventional cutting machine having a lower productivity provided with a single electrospindle; and carry out the necessary additional movements along the horizontal direction (towards and away from the first electrospindle centrally arranged in the configuration with three electrospindles) and vertical direction (towards and away from the working plane) of the third electrospindle by means of actuator devices that can also be very simple, lightweight and of low-cost.

In the various preferred embodiments of the invention described above, therefore, the first electrospindle is moved along the vertical direction towards and away from the working plane by the moving system provided to this end and active on the aforementioned single supporting equipment provided for this purpose, while the additional electrospindle or electrospindles are moved along the vertical direction towards and away from the working plane by two distinct components of the machine: by the supporting equipment of the first electrospindle (integral movement of all of the electrospindles of the machine) and, when required, by the aforementioned second and/or fourth actuator device (independent movement of the second and/or of the third electrospindle towards and away from the working plane).

In this way, it is advantageously possible to achieve the maximum operational flexibility of the machine, since it is possible to bring the desired number of cutting discs into engagement with the slab to be cut according to the machining requirements by using the supporting equipment of the first electrospindle and/or the aforementioned second and fourth actuator devices for moving the second and/or the third electrospindle (if present) towards and away from the working plane.

In the various preferred embodiments of the invention described herein, moreover, the supporting arms of the additional electrospindles can be advantageously moved along the horizontal direction in parallel to the working plane towards and away from the first electrospindle by means of very simple, compact, low-weight and low-cost devices, since they have to move equally simple, compact, low-weight and low-cost elements formed by an electrospindle with the corresponding directly-driven cutting disc and by the respective actuator device for moving the latter towards and away from the working plane.

In this way, it is also advantageously possible to obtain the maximum operational flexibility of the machine in a simple and inexpensive manner.

In a particularly preferred embodiment of the machine of the invention, a housing zone of the supporting arm of said at least a second electrospindle and/or of the supporting arm of said third electrospindle is defined in the supporting body of the first electrospindle.

Within the framework of this preferred embodiment, the first actuator device and/or the third actuator device is configured to insert and, respectively, extract the respective supporting arm into/from said housing zone.

Thanks to the presence of the housing zone of the supporting arm of the second electrospindle and/or of the third electrospindle in the supporting body of the first electrospindle it is advantageously possible to drastically reduce both the masses involved and the mechanical moment that develops during rotation about the vertical axis with respect to those of the machines provided with a plurality of cutting units in parallel of known type supported by a horizontal beam as described in International patent application WO 2014/207723.

In this way, the machine of the invention allows to ensure a precise angular positioning of the cutting blades over time limiting to the maximum phenomena of premature wearing of the motion transmission elements, for example of the gears of a geared motor, used to rotate the electrospindles about the axis of rotation perpendicular to the working plane (axis W).

In particular, compared to the known machine disclosed in WO 2014/207723, the machine according to the present invention allows to drastically reduce the mechanical moment that develops during the rotation about the vertical axis thanks to the possibility of fully or partially inserting the movable supporting arm of the second electrospindle and/or the movable supporting arm of the third electrospindle into the housing zone defined in the supporting body of the first electrospindle, thereby drastically reducing the moment of inertia and the torque required to carry out a rotation about the vertical axis. Compared to the known machine disclosed in WO 2014/207723, the machine according to the present invention also achieves the further advantage of having a greater flexibility of use since the extreme compactness and the reduced lateral dimensions of the multi-spindle cutting unit—related to the possibility of partially or totally inserting the supporting arm of the second electrospindle and/or of the third electrospindle into the housing zone defined in the supporting body of the first electrospindle—allows to carry out a rotation of the cutting unit also in the peripheral zones of the cutting volume. Conversely, the supporting beam of the known machine disclosed by WO 2014/207723 has a transverse dimension which cannot be reduced in any way even when the machine is used for single cuts or for parallel and relatively close cuts, with the consequence of having a bulky cutting unit, which implies a twofold drawback: preventing the rotation of the cutting unit near the peripheral zones of the cutting volume limiting the flexibility of use of the machine and generating a high moment of inertia requiring a higher torque to have such a rotation.

Preferably, the housing zone of the supporting arm of said at least a second electrospindle, and/or of the third electrospindle, is defined in a substantially hollow box-shaped portion of the supporting body of the first electrospindle. In a particularly preferred embodiment of the machine of the invention, the first actuator device is configured to move the movable supporting arm of said at least a second electrospindle along said direction substantially perpendicular to the cutting plane extending perpendicularly to the working plane between:
- a first insertion position wherein the supporting arm of said at least a second electrospindle is completely housed within the respective housing zone defined in the supporting body of the first electrospindle; and
- a second extraction position wherein the supporting arm of said at least a second electrospindle is at least partially extending in a cantilevered fashion out of the supporting body of the first electrospindle.

Similarly, the third actuator device is preferably configured to move the supporting arm of the third electrospindle along the aforementioned direction substantially perpendicular to the cutting plane extending perpendicularly to the working plane between:
- a first insertion position wherein the supporting arm of the third electrospindle is completely housed within the respective housing zone defined in the supporting body of the first electrospindle; and
- a second extraction position wherein the supporting arm of the third electrospindle is at least partially extending in a cantilevered fashion out of the supporting body of the first electrospindle.

In this way, it is advantageously possible to insert and extract the supporting arms of the second and/or of the third electrospindle with a guided sliding in a drawer-like fashion and to achieve a high compactness of the supporting equipment of the first electrospindle and of the additional electrospindles in any configuration, of insertion, of partial or total extraction, of the supporting arms.

Preferably, the supporting arm of the second and/or of the third electrospindle is substantially drawer-shaped.

In this way, it is advantageously possible to position in a precise manner the second and/or the third electrospindle, the insertion and extraction movements of which are effectively guided by means of a drawer-type sliding of the arms towards and away from the supporting body of the first electrospindle.

In a particularly preferred embodiment of the machine of the invention, the supporting arm of said at least a second electrospindle and/or of the third electrospindle comprises at least one rod-shaped element slidably mounted in the housing zone defined in the supporting body of the first electrospindle. Preferably, the supporting arm of said at least a second electrospindle and/or of the third electrospindle comprises a pair of rod-shaped elements, preferably hollow rod-shaped elements, parallel to each other.

In this way, it is advantageously possible to precisely arrange the second and/or the third electrospindle using a suitably rigid structure of the respective supporting arms which is at the same time lightweight and of low cost.

Preferably, the supporting arms of said second and of said third electrospindle at least partially interpenetrate with each other in the housing zone defined in the supporting body of the first electrospindle.

In this way, it is advantageously possible to achieve a maximum size reduction of the housing zone of the supporting arms of the second electrospindle and of the third electrospindle defined in the supporting body of the first electrospindle.

Thus, for example, such a housing zone can be dimensioned in such a way as to have the minimum possible transverse dimension, substantially equal to the length of the supporting arms of the second and of the third electrospindle.

In an alternative preferred embodiment, the supporting arm of said at least a second electrospindle and/or of the third electrospindle is substantially telescopic.

Also in this case, it is advantageously possible to reduce the transverse dimensions of the multi-spindle cutting unit and to have an increased operational flexibility of the machine of the invention by extending or retracting the telescopic supporting arms of the second electrospindle and/or of the third electrospindle.

In a further preferred embodiment of the invention, the supporting arm of said at least a second tool-holder electrospindle and/or the supporting arm of said at least a third tool-holder electrospindle is slidably supported externally to the supporting body of the first electrospindle.

This additional preferred configuration of the machine according to the invention finds in particularly an advantageous use when the machine includes more than three electrospindles in total, for moving along the horizontal direction and in parallel to the working plane a fourth and, possibly, a fifth electrospindle.

In additional preferred embodiments, in fact, the machine according to the invention may comprise a number of additional electrospindles rotationally and translationally integral with the first electrospindle greater than two as a function of specific application requirements aiming at increasing the productivity of the machine for large-scale productions.

Advantageously, the machine according to the invention may therefore preferably comprise from two to eight or more additional electrospindles rotationally and translationally integral with the first electrospindle, according to configurations having from three to nine or more electrospindles in total.

Preferably, the electrospindles additional to the first one are even in number so as to obtain a symmetrical configuration of masses with respect to the first electrospindle with the corresponding benefits in terms of balance of masses. Preferably, all the electrospindles additional to the first one of the machine in its various configurations are supported by supporting arms analogous to those described above with reference to the preferred embodiment with three electrospindles in total (two additional electrospindles).

Preferably, all the electrospindles additional to the first one of the machine in its various configurations are moved towards and away from the first electrospindle and along a direction perpendicular to the working plane by means of respective actuator devices, configured to act on the respective supporting arms, entirely similar to those described with reference to the preferred embodiment with three electrospindles in total (two additional electrospindles).

The preferred features illustrated above with reference to the preferred embodiment with three electrospindles in total (two additional electrospindles), are also applicable to machine configurations with four or more electrospindles in total.

Within the framework of a further preferred embodiment with four electrospindles and similarly to what was outlined above, the machine therefore comprises:
- a fifth actuator device configured to act on the supporting arm of the fourth electrospindle to move said supporting arm and said fourth electrospindle supported by the same towards and away from the first electrospindle in parallel to the working plane and along a direction substantially perpendicular to a cutting plane extending perpendicularly to the working plane; and
- a sixth actuator device associated to the supporting arm of the fourth electrospindle and configured to move the fourth electrospindle along a direction perpendicular to the working plane independently of the first, of the second and, possibly, of the third electrospindle.

Within the framework of a further preferred embodiment with five electrospindles a seventh and an eighth actuator device will also be provided, configured to act on the supporting arm of the fifth electrospindle to achieve the above movements parallel and perpendicular to the working plane.

In the aforementioned preferred embodiments, the actuator devices configured to act on the supporting arms of the electrospindles additional to the first (for example, second-fifth) can be configured to slide such supporting arms externally and in parallel to the supporting body of the first electrospindle.

Advantageously, this preferred configuration allows to drastically reduce both the masses involved and the mechanical moment that develops during the rotation about the vertical axis, in particular when the machine includes more than two electrospindles in total, for example, four or five.

Also in this case, therefore, the machine of the invention allows to ensure a precise angular positioning of all of the cutting blades over time limiting to the maximum phenomena of premature wearing of the motion transmission elements, for example of the gears of a geared motor, used to rotate the electrospindles about the axis of rotation perpendicular to the working plane (axis W).

In a particularly preferred embodiment of the machine of the invention and similarly to what has been illustrated above, the supporting arm of said at least a second electrospindle and/or of said at least a third electrospindle comprises at least one rod-shaped element, still more preferably a pair of rod-shaped elements, slidably mounted externally to the supporting body of the first electrospindle.

As outlined above, these rod-shaped elements are preferably hollow and parallel to each other.

In this way, it is advantageously possible to precisely arrange the electrospindles additional to the first one by using a structure of the respective supporting arms adequately rigid but at the same time lightweight and of low cost.

Also this further preferred configuration of the machine according to the invention finds a particularly advantageous use when the machine comprises more than three electrospindles in total, for moving along the horizontal direction and in parallel to the working plane a fourth and, possibly, a fifth electrospindle.

In a preferred embodiment, the supporting arms of the electrospindle slidably supported externally to the supporting body of the first electrospindle are supported in alignment to each other (i.e. without mutual interpenetration as described earlier).

Preferably, said at least a second electrospindle and/or said at least a third electrospindle is translationally integral with the respective supporting arm along a moving direction of the arm in parallel to the working plane.

In this way, it is advantageously possible to move such electrospindles by using only the first and/or the third actuator device (or the corresponding actuator devices of any additional electrospindles) configured to act on the supporting arms of the electrospindles and configured to move said arms along said direction substantially perpendicular to the cutting plane extending perpendicularly to the working plane.

In a further preferred embodiment, said at least a second electrospindle and/or said at least a third electrospindle can be slidably supported by the respective supporting arms.

In this case, the machine preferably comprises additional moving devices configured to move said at least a second electrospindle and/or said at least a third electrospindle along said direction substantially perpendicular to the cutting plane extending perpendicularly to the working plane.

In this way and if desired, it is advantageously possible to move said at least a second and/or said at least a third electrospindle using the first and/or the third actuator device (or the corresponding actuator devices of any additional electrospindles) configured to act on the supporting arms of the electrospindles and possibly these additional moving devices configured to act on the electrospindles if the supporting arms are partially or fully extending away from the supporting body of the first electrospindle.

Preferably, said at least a second electrospindle and/or said at least a third electrospindle is supported below the respective movable supporting arm near a free end portion thereof.

In this way, it is advantageously possible to support the electrospindles in parallel to each other and to connect in a mechanically simple manner all the electrospindles of the machine in addition to the first electrospindle so as to move all the electrospindles together by means of only the supporting equipment of the first electrospindle.

Preferably, the first actuator device configured to act on the supporting arm of the second electrospindle and/or the third actuator device configured to act on the supporting arm of the third electrospindle comprises a linear actuator, for example of the ball screw drive type.

In this way, it is advantageously possible to position the electrospindles with extreme precision and ensure that the cutting operation takes place at an equally precise manner according to parallel and spaced cutting planes according to the settings stored in the control software loaded in the operation and control unit of the machine.

Preferably, the second actuator device and/or the fourth actuator device respectively configured to move the second and the third electrospindle along a direction perpendicular to the working plane, are selected from a pneumatic actuator and an electromechanical actuator.

By using a pneumatic actuator, it is advantageously possible to carry out the additional movements of the second and/or of the third electrospindle (electrospindles located beside the first electrospindle) towards and away from the working plane in a mechanically simple manner with the consequent cost reduction and simplicity of the machine.

By using an electromechanical actuator, for example of the screw type, for example of the ball screw drive type, on the other hand, it is advantageously possible to move the second and/or the third electrospindle very precisely towards and away from the working plane whenever it is necessary to keep the cutting discs active on the slab at the maximum distance from each other, for example of about 130 cm, without using the first electrospindle and the cutting disc associated thereto.

It is evident to a person skilled in the art that the above preferred configuration of the actuator devices of the second and of the third electrospindle previously described is also applicable also to any possible additional electrospindles (fourth, fifth, etc.) if they are present in the machine.

In a particularly preferred embodiment, the supporting body of the first electrospindle is fixed to an end of the supporting equipment of the first electrospindle proximal to the working plane.

Preferably, the first electrospindle is pivotally connected to said supporting body.

In this way, it is advantageously possible to impart to the first electrospindle additional rotational movements about a rotation axis perpendicular to the aforementioned axis Z, in other words parallel to the working plane in the cutting configuration of the machine.

In the following description and in the subsequent claims this direction of rotation will also be indicated with the term direction or axis R.

In this way, it is also advantageously possible to provide a machine for machining slab materials having a high productivity which is not only simple, low-cost and capable of maintaining the cutting precision over time with respect to the known machines described above, but is also capable of carrying out additional machining operations on the slab material thereby increasing the production flexibility of the machine.

Thanks to the synergic cooperation between the supporting and moving structure of the electrospindles described above with the pivoting configuration of the first electrospindle, in fact, it is possible both to carry out inclined cuts relative to the vertical or horizontal cuts in the thickness of the slab, and to carry out drilling operations or additional machining operations of the slab edges by using suitable tools instead of the cutting disc of the first electrospindle.

In this respect, this preferred embodiment of the machine of the invention allows to configure the first electrospindle to perform these various operations with easy and less cumbersome replacing operations of just the machining tool and without having to replace the entire electrospindle as required by the machines provided with a plurality of cutting groups in parallel of the prior art.

This preferred configuration of the machine according to the invention also allows to achieve additional advantageous technical effects.

Firstly, the technical effect of allowing a wide variety of machining operations to be performed on the slab material using one or more electrospindles:
- vertical cuts using one or more electrospindles in parallel to the aforementioned directions X and Y;
- oblique cuts along the slab plane using one or more electrospindles and combining simultaneous movements in parallel to the aforementioned directions X and Y;
- inclined cuts with respect to the vertical and oblique cuts (along the plane of the slab) using the first electrospindle;
- horizontal cuts in the slab thickness using the first electrospindle;
- drilling and milling operations of the slab edge using the first electrospindle by positioning the same perpendicularly to the working plane.

Secondly, the technical effect of increasing the speed of execution of complex machining operations on the same slab since it may be possible to use a single machine upon rotation by 90° of the first electrospindle and of the cutting disc driven by the same with respect to the vertical cutting configuration or upon replacement of such a disc with another machining tool, again directly driven by the first electrospindle.

Preferably, the supporting body of the first electrospindle is provided with a substantially fork-shaped end in which the first electrospindle is rotatably mounted.

Within the framework of the present description and in the following claims, the expression "substantially fork-shaped" is used to indicate a supporting element configured to allow a rotation of the first electrospindle about the aforementioned direction R perpendicular to the vertical axis Z, in other words parallel to the working plane in the slab cutting configuration of the machine. This supporting element may be provided with two shaped arms within which the first electrospindle is rotatably supported, or may be provided with a single suitably shaped arm, configured to rotatably support the first electrospindle.

Preferably, the rotation of the first electrospindle about the axis R perpendicular to the axis Z is driven by a motor mounted on the supporting equipment of the first electrospindle or, alternatively, mounted on the aforementioned supporting body of the first electrospindle.

Preferably, the supporting equipment of the first electrospindle comprises a braking device configured to prevent relative rotation movements between a part of the supporting equipment not rotatable about a direction perpendicular to the working plane (axis Z) and a part of said equipment rotatable about said direction (axis Z) and associated to the first electrospindle.

Advantageously, such a braking device substantially completely absorbs the torsion stresses which are developed in the case of cuts, for example oblique cuts, carried out with the cutting disc driven by the second and/or by the third electrospindle and spaced with respect to a fulcrum represented by the vertical rotation axis Z of the first electrospindle.

In this way, it is advantageously possible to drastically reduce, if not substantially eliminate, premature wearing phenomena of the gears of the moving device, for example and preferably a zero-clearance gear motor, used in the machine to rotate the first electrospindle and the additional electrospindle(s) translationally and rotationally integral therewith about the axis Z contributing to ensure the cutting precision of the machine over time. Preferably, the aforementioned braking device comprises a fixed element associated to the fixed part of the supporting equipment and a movable element associated to the supporting body of the first electrospindle.

Preferably, the elements of the braking device are substantially ring-shaped and are coaxially arranged outside of the moving device, for example and preferably the aforementioned zero-clearance gear motor, used in the machine to rotate the first electrospindle and the additional electrospindle(s) translationally and rotationally integral therewith about the axis Z.

In a particularly preferred embodiment, the machine of the invention further comprises a manipulator group of a slab material to be machined or machined rotationally and translationally integral with the first electrospindle.

In this way, it is advantageously possible to provide a high-productivity machine for machining slab materials which is not only simple, low-cost and capable of maintaining cutting precision over time with respect to the known machines described above, but which is also capable of moving the slab to be cut and/or the pieces obtained therefrom in a mechanically simple and inexpensive manner.

Thanks to the synergic cooperation between the supporting and moving structure of the electrospindles described above and the manipulator group of the slab material rotationally and translationally integral with the first electrospindle, in fact, it is possible to move the slab to be cut and/or the pieces obtained therefrom without recurring to complex manipulator groups provided with respective and autonomous dedicated actuator devices as foreseen by the known machine having a plurality of cutting discs described above.

In this preferred embodiment, in fact, the machine according to the invention advantageously allows to move the manipulator group of the slab material by means of the same moving apparatus of the first electrospindle so as to achieve a considerable structural simplification of the machine with respect to the known machine having a plurality of cutting discs described above.

Preferably, the manipulator group is positioned in parallel to a cutting plane extending perpendicularly to the working plane and frontally with respect to said first electrospindle.

In this way, in the preferred embodiment wherein the first electrospindle is rotatably mounted on the supporting body described above, the manipulator group integrally rotates with the first electrospindle about the axis R perpendicular to the axis Z.

This configuration allows to achieve a machine which is not only capable of carrying out additional machining operations on the slab material to the benefit of the production flexibility of the machine itself, but which is also capable of achieving a series of additional remarkable advantages.

Unlike the known machine having a plurality of cutting discs described above wherein the gripping means are activated with an additional vertical translation with respect to the vertical translation of the cutting groups, in fact, in the machine according to the present invention the manipulator group is rotatable into the operative gripping position of the slab or of the pieces obtained therefrom, in which operative position the manipulator group stays as long as necessary, to then be brought back into a non-operative position. This feature allows to use the same system of axes X, Y, Z, W and R relative to the first electrospindle and, therefore, the same moving devices also for the manipulator group.

The operation and control unit of the machine will therefore use a single system of axes for the movement both of the first electrospindle, and of the manipulator group, avoiding the correlation of distinct reference systems, with obvious simplifications of the operation of the machine as a whole.

Basically, the manipulator group and the first electrospindle integrally rotate about the aforementioned axis R perpendicular to the vertical axis Z, in other words parallel to the working plane in the cutting configuration of the machine, and are simultaneously rotated about said axis R by the same moving apparatus described above and active on the first electrospindle.

In addition to that, the manipulator group of this preferred embodiment of the machine according to the present invention is advantageously capable to pick up the worked slab material from the working plane on which the same horizontally lies and to rotate the same to reach a substantially vertical position so as to have the possibility of placing the worked slab material on a lateral support of the slabs alongside with other slabs.

Preferably, the manipulator group is associated to or incorporated in a protective casing of a cutting disc driven by the first electrospindle.

In this way, it is advantageously possible to achieve the technical effects described above with a structural configuration of the machine that is very simple and compact.

Preferably, the first electrospindle is rotatable between an operative position, wherein a cutting disc driven by said first electrospindle can interact with a slab being machined and the manipulator group is in a respective first non-operative position distal with respect to the working plane, and a second non-operative position, wherein the cutting disc cannot interact with the slab and the manipulator group is in a second operative position proximal with respect to the working plane.

Preferably, the rotation of the manipulator group and of the first electrospindle is comprised between 0° and 90°.

Preferably, the manipulator group and the first electrospindle, describe during rotation corresponding arcs of circumference.

Therefore, in the respective operative position (proximal to the material to be machined) the manipulator group is at the same height along the axis Z occupied by the cutting disc when the latter is operative.

Preferably, the manipulator group comprises gripping means of the suction type, preferably of pneumatic type.

Preferably, the gripping means comprise at least one plate, provided with at least one suction cup, more preferably a plurality of suction cups.

Preferably, this plate can be incorporated in a protective casing of the cutting disc driven by the first electrospindle, in other words form an integral part of the casing, for example and preferably a front closing door of the casing, or it can be associated to such a protective casing outside of the same.

In this latter case, the plate of the gripping means is preferably associated to the protective casing of the cutting disc, or to other parts of the first electrospindle, frontally with respect to the cutting disc.

Preferably, the gripping means comprise one or more air suction ducts which open in each suction cup. For example, each suction cup can be defined by a shaped gasket applied to the plate so as to circumscribe a portion of the corresponding surface and the suction ducts are partially formed in the material of the plate and open in the surface delimited by the gasket.

Preferably, the manipulator group comprises one or more intercepting valves of the suction ducts. Such valves can be arranged along sections of the corresponding ducts outside of the plate, or they can be coupled directly to the plate.

Preferably, the intercepting valves are solenoid valves which may be driven by the operation and control unit of the machine.

When the gripping means are in abutment against the slab material being machined or already machined, in practice when the gripping means of the manipulator group are arranged in the second operative position and resting on the material, the gaskets are at least partially compressed against the upper surface of the slab material; the opening of the intercepting valves of the suction ducts allows a depression to be created in the volume comprised between the slab material and the gripping means, actually achieving a suction effect.

In this operating mode, the lifting along the axis Z of the first electrospindle and of the manipulator group associated thereto, carried out by the supporting equipment of the first electrospindle, causes the corresponding lifting of the slab being machined that can consequently be repositioned using the moving apparatus of the first electrospindle. The closure of the suction ducts and the introduction of compressed air in the volume comprised between the material and the gripping means causes a pressure recovery and the consequent release of the slab material.

In a preferred embodiment, the machine according to the invention may be equipped with a proximity sensor or with a limit switch, arranged on the manipulator group or on the first electrospindle, having the function of signalling when the manipulator group or the first electrospindle is at a predetermined distance from the material being machined.

The signal generated by the sensor, suitably processed, can be used to prevent violent collisions of the manipulator group against the slab material being machined. Finally and as stated above, the machine preferably comprises an operation and control unit of the movements of the components described above of the machine, in other words of the supporting equipment of the first electrospindle and of the additional electrospindles rotationally and translationally integral therewith, of the moving apparatus of the supporting equipment of the first electrospindle with respect to the working plane, of the actuator devices of the supporting arms of the additional electrospindles with respect to the first electrospindle and with respect to the working plane and of the manipulator group if present.

In this way, it is advantageously possible to carry out a wide variety of machining operations by suitably programming the operation and control unit with a minimum labour intervention.

BRIEF DESCRIPTION OF THE FIGURES

Additional features and advantages of the present invention will become more clearly apparent from the following description of a preferred embodiment thereof, made hereinafter, for illustrating and not limiting purposes, with reference to the attached drawings. In such drawings:

FIG. 5a is a top perspective schematic view, also partially exploded, of a portion of the machine of FIG. 1, in particular of the supporting arms of the lateral electrospindles in the operative configuration of the machine illustrated in FIG. 2;

FIG. 5b is a schematic top plan view of some details of the supporting arms of the lateral electrospindles and of the related actuator devices in the operative configuration of the machine illustrated in FIG. 2;

FIGS. 7a-7g are schematic front views of the electrospindles and of some details of the machine shown in FIG. 1 in as many operative configurations thereof;

FIG. 7h is a schematic front view of the first electrospindle of the machine of FIG. 1 wherein the machining tool is an end mill and wherein such a tool is in a working configuration of the machine.

DETAILED DESCRIPTION OF A CURRENTLY PREFERRED EMBODIMENT OF THE INVENTION

Figure 1:
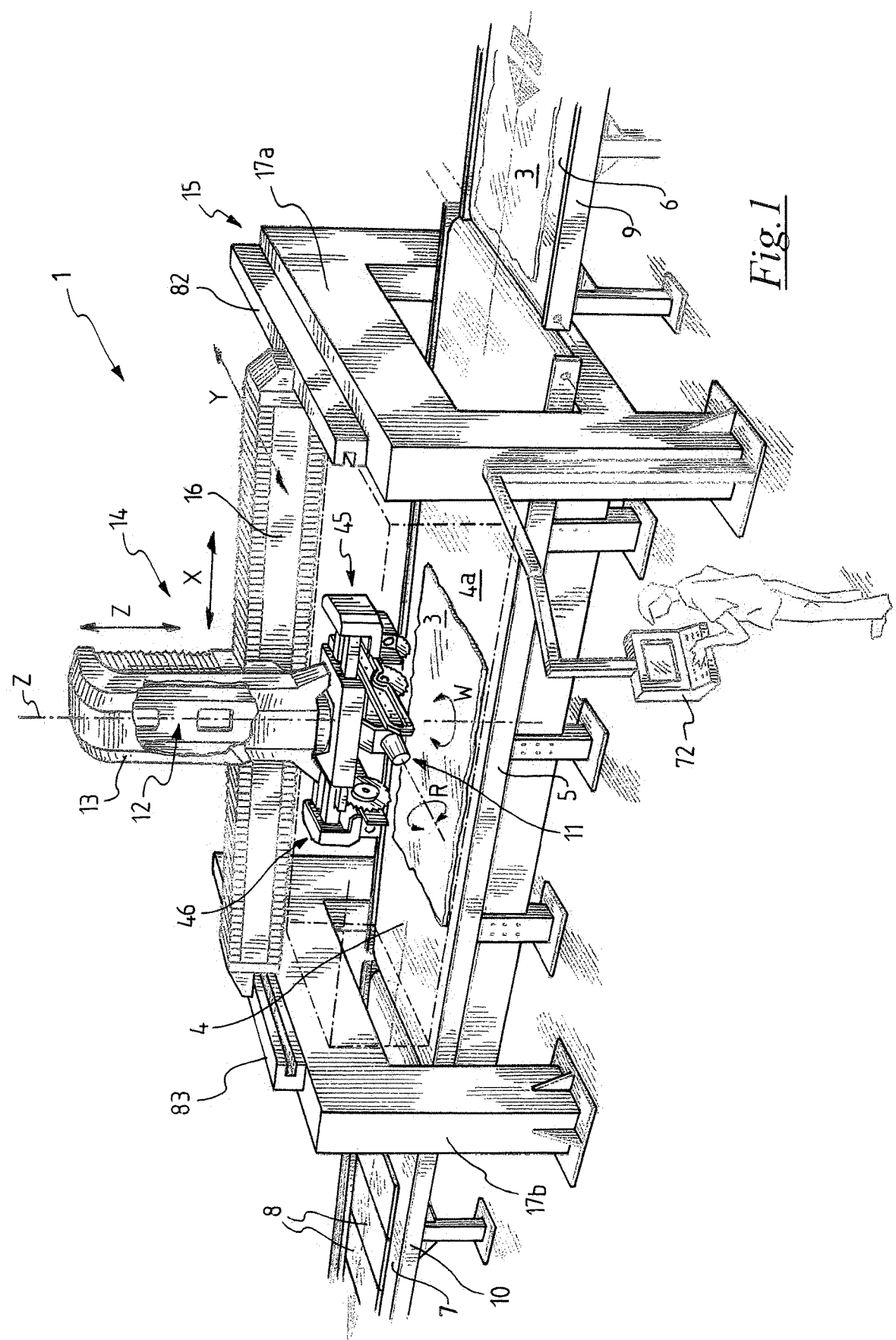
FIG. 1 is a schematic perspective view of a preferred embodiment of a machine for machining slab materials according to the invention.

With reference to FIGS. 1-7h, a machine for machining slab materials 3, in particular for large-scale production of pieces of standard dimensions, such as for example tiles, skirtings or kitchen counters, according to a first preferred embodiment of the invention, is generally indicated at 1.

The slab material 3 which may be machined with the machine 1 can be a natural stone material, such as for example marble, an agglomerated stone material, a ceramic or glass material without this being in any way limiting.

The machine 1 comprises a working plane 2 configured to support the slab material 3 to be machined, for example a slab of marble.

The working plane 2 can for example be defined by the upper surface 4a of a conveyor belt 4 supported in a conventional manner by a frame 5.

In an alternative preferred embodiment, not shown, the working plane 2 can be defined by a fixed table supported by a frame in a way known per se.

The conveyor belt 4 is operatively connected to a second conveyor belt 6 configured to feed the slab material 3 to be machined to the working plane 2 and to a third conveyor belt 7 configured to transport pieces 8 obtained from the slab material 3 by means of the machine 1 towards further machining operations, towards storage or towards packaging.

Preferably, the conveyor belts 6 and 7 are supported by respective frames, conventional per se, indicated at 9 and 10.

In this way, it is advantageously possible to speed up as much as possible the feeding and removing operations of the pieces to/from the working plane 2, as required in the case of large-scale production of pieces 8 of standard dimensions required to the machine 1.

Thus, for example, the pieces 8 can be marble tiles of standard dimensions. In the preferred embodiment illustrated in FIG. 1, the working plane 2 is stationary during the machining operations carried out with the machine 1.

Alternatively, the working plane 2 can be motorised and rotatable about the vertical direction, in which case it is necessary to equip the conveyor belt 4 (or the table) with a suitable moving apparatus.

The machine 1 comprises a first tool-holder electrospindle 11 supported above the working plane 2 by a respective supporting equipment 12 perpendicularly movable with respect to the working plane 2.

The first electrospindle 11 directly rotates a machining tool, for example a respective cutting disc 35, and comprises a motor 36, preferably a liquid-cooled electric motor of very small size (see FIG. 5a).

In order to carry out other machining operations on the slab, such as for example drilling or grinding, the machining tool driven by the first electrospindle 11 can be an end mill (as illustrated for example in FIG. 7h which will be further discussed hereinafter), a grinder, or other tool suitable for the purpose.

In this case, the electrospindle 11 is preferably and advantageously provided with gripping means for a tool-holder connection so as to associate an additional machining tool to the drive shaft of the motor 36.

Figure 6:
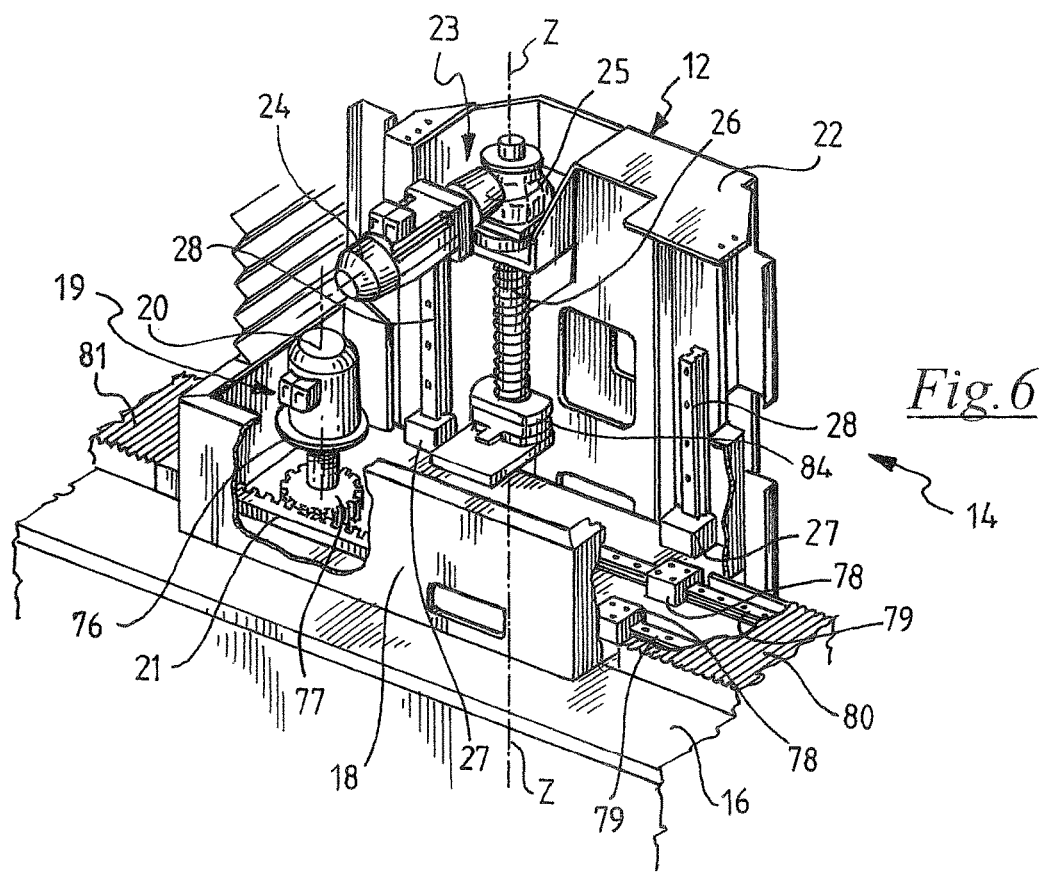
FIG. 6 is a schematic perspective view from above of some details of the moving apparatus of the first electrospindle and of the respective supporting equipment.

The machine 1 further comprises a moving apparatus 14 configured to move the first electrospindle 11 and the respective supporting equipment 12 in parallel to the working plane 2 and along directions perpendicular to one another (see FIGS. 1 and 6).

According to the conventions used in the art and as outlined above, these translation directions perpendicular to one another and parallel to the working plane 2 will be designated hereinafter as direction or axis X and direction or axis Y.

In a manner conventional per se, the machine 1 further comprises a supporting structure 15 having the function of maintaining the first electrospindle 11 and the respective supporting equipment 12 and moving apparatus 14 suspended above the working plane 2 on which the slab material 3 to be machined is positioned.

In the preferred embodiment shown in FIG. 1, the supporting structure 15 comprises a horizontal bridge 16 which rests, at opposite ends thereof, on vertical supporting structures or shoulders 17a, 17b extending along a direction perpendicular to the bridge 16 itself. The supporting structure 15 thus comprises at least the elements 16, 17a and 17b.

Preferably, the moving apparatus 14 comprises a motorised carriage 18, configured to be moved on the bridge 16 in parallel to the axis X by the action of a respective actuator device 19 (see FIG. 6), for example comprising an electric motor 20 which rotates by means of a gear motor 76, for example and preferably a zero-clearance gear motor, a gear wheel 77 engaged with a rack 21, fixed in a way known per se to the bridge 16.

In this way, the actuator device 19 is configured to move along the axis X the motorised carriage 18 and the elements of the machine 1 associated thereto. Preferably, the movement of the motorised carriage 18 along the bridge 16 (direction X) is advantageously guided thanks to the engagement of respective carriages 78, fixed to the motorised carriage 18, with respective linear guides or sliding blocks 79 fixed on the bridge 16 (see FIG. 6).

In this way, it is advantageously possible to have a precise movement along the horizontal direction and along the axis X of the motorised carriage 18 and of the components associated thereto (the first electrospindle 11 and the respective supporting equipment 12).

Preferably, the linear guides 79 and in general the upper part of the bridge 16 are advantageously protected from the outside by means of a pair of protective casings 80, 81 preferably of the bellows type and positioned at opposite sides of the motorised carriage 18.

In turn and in an equally conventional manner not shown in the figures, the bridge 16 is movable along runways 82, 83 supported by the vertical supporting structures 17a, 17b perpendicularly to the bridge thanks to the action of an actuator device, conventional per se and not shown, configured to move the bridge 16 in parallel to the axis Y.

The supporting equipment 12 of the first electrospindle 11 is preferably housed in a protective casing 13 and is movable perpendicularly to the working plane 2.

Figure 2:
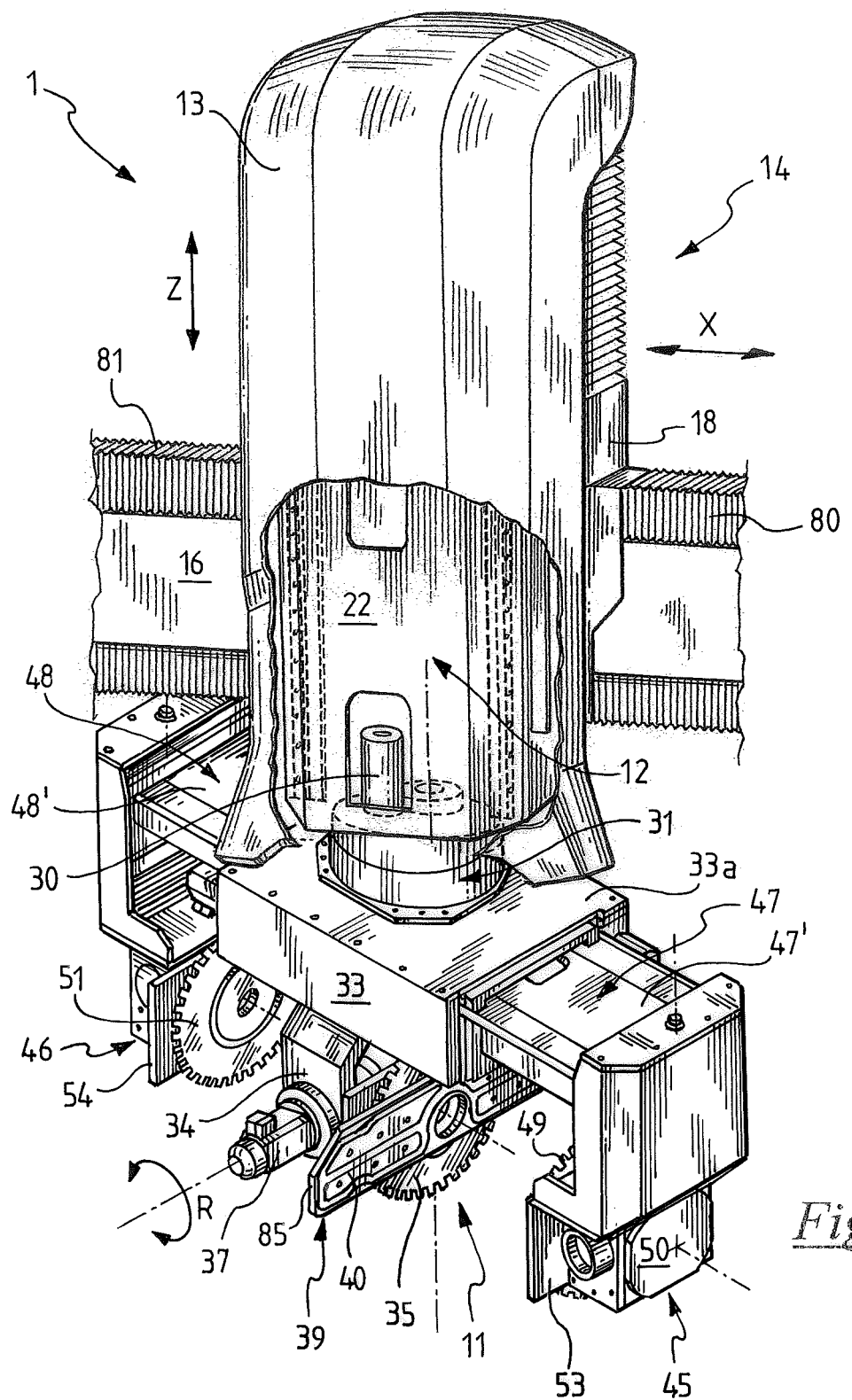
FIG. 2 is a schematic perspective view and in partial section of a portion of the machine of FIG. 1 in a possible operative configuration thereof, in which the electrospindles are visible and in which the supporting arms of the lateral electrospindles are partially extended out of a supporting body the central electrospindle.

Preferably, the supporting equipment 12 comprises a supporting body 22, preferably substantially plate-shaped, driven along a direction perpendicular to the working plane 2 by a respective actuator device 23 supported by the carriage 18 and arranged in the upper part of the supporting equipment 12 (see FIGS. 1, 2 and 6).

Preferably, the supporting equipment 12 also has the function of guiding supply lines conventional per se, not shown, towards the first electrospindle 11.

In a way known per se, these supply lines preferably comprise at least one electrical supply line and at least one supply line of a cooling fluid, for example water, intended to cool the machining tool driven by the first electrospindle 11 (for example the cutting disc 35) and the cutting discs of the additional electrospindles of the machine 1 which will be further described hereinafter. Preferably, the supply lines are fixed to the body 22 in a conventional manner. Preferably, the actuator device 23 of the supporting equipment 12 is a linear actuator and comprises an electric motor 24 which rotates a ball screw 26 by means of a gear motor 25, preferably having zero clearance.

In the preferred embodiment illustrated, the ball screw 26 is fixed to the body 22 of the supporting equipment 12 and is in screwing engagement in a nut screw block 84 fixed to the motorised carriage 18.

Preferably, the movement of the supporting equipment 12 along the vertical direction (direction Z) is advantageously guided thanks to the engagement of respective carriages 27, fixed to the motorised carriage 18, with respective linear guides or sliding blocks 28 fixed to the body 22 (see FIG. 6).

In this way, it is advantageously possible to have a precise movement along the vertical direction (axis Z) of the supporting equipment 12 and of the first electrospindle 11 associated thereto.

The supporting equipment 12 movable perpendicularly to the working plane 2 is also configured to move the first electrospindle 11 about the axis Z perpendicular to the working plane.

According to the conventions in use in the art and as illustrated above, such a direction of rotation (illustrated with a double arrow in FIG. 1) will also be called hereinafter axis W.

Figure 3:
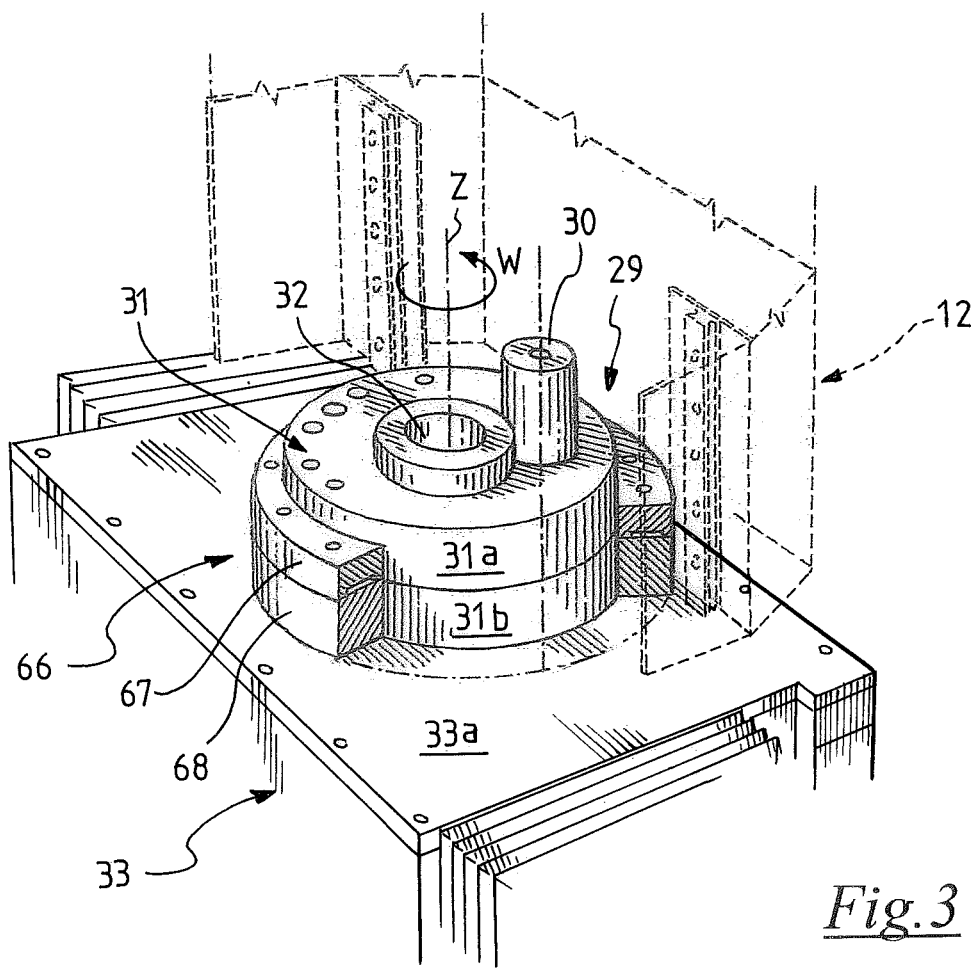
FIG. 3 is a schematic perspective view of some details of a braking device which may be used in a preferred embodiment of the machine shown in FIG. 1.
Figure 4:
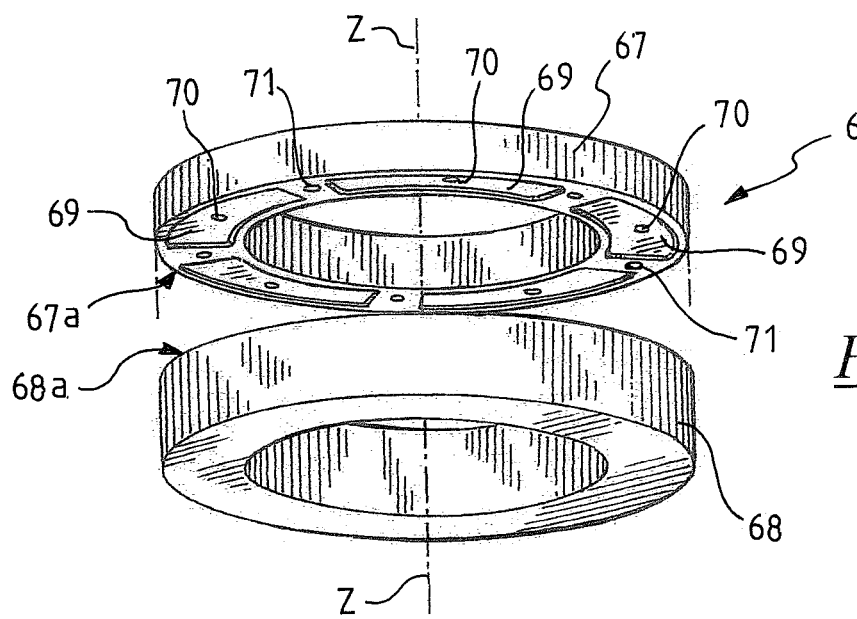
FIG. 4 is a schematic perspective view of two rings forming part of the braking device shown in FIG. 3.

To this end, the supporting equipment 12 comprises a respective actuator device 29 supported by the supporting equipment 12 and preferably arranged in the lower part of the substantially plate-shaped body 22 (see FIG. 3).

Preferably, the actuator device 29 comprises an electric motor 30, preferably of the brushless type, which rotates the first electrospindle 11 about the axis Z by means of a gear motor 31 having parallel axes, preferably with zero clearance.

Preferably, the gear motor 31 is ring-shaped and comprises a central through hole 32 in which electrical power cables and the ducts for supplying the cooling fluid (not illustrated) necessary for the operation of the first electrospindle 11 and of the additional electrospindles of the machine 1 are received, which electrospindles will be further discussed hereinafter.

Preferably, the gear motor 31 comprises a fixed upper part 31a associated to the supporting equipment 12 and a lower part 31b movable with respect to the supporting equipment 12.

In the preferred embodiment illustrated, the first electrospindle 11 is rotatably mounted on a supporting body 33, which is in turn preferably provided with a fork-shaped end 34.

Figure 5:
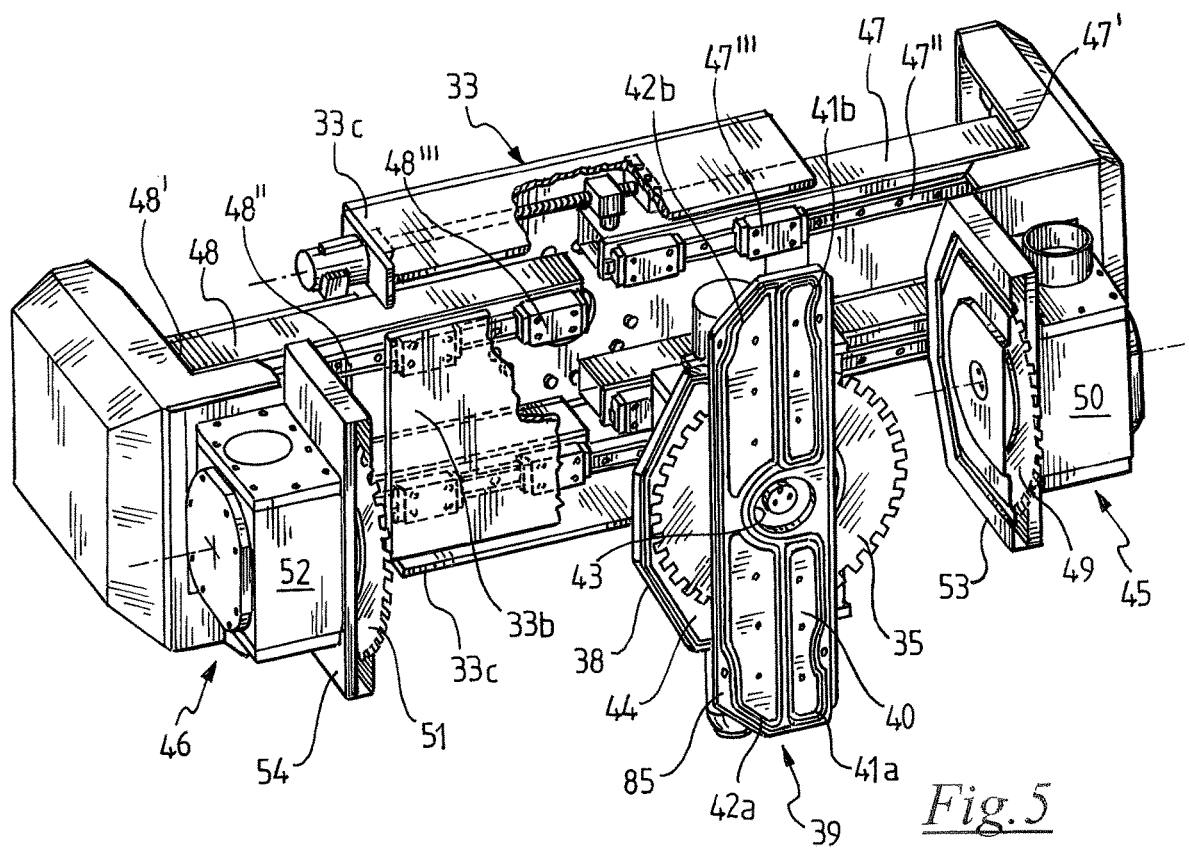
FIG. 5 is a schematic perspective view from below of a portion of the machine of FIG. 1, in particular of the supporting arms of the lateral electrospindles in the operative configuration of the machine illustrated in FIG. 2.

Preferably, the supporting body 33 is fixed to a lower end of the supporting equipment 12 of the first electrospindle 11 proximal to the working plane 2 (see FIGS. 2, 3 and 5).

More specifically, the electrospindle 11 is rotatably mounted in the fork-shaped end 34 of the supporting body 33 about a respective axis (or direction) of rotation R, perpendicular to the vertical axis Z, by means of rotation pins, not shown.

In practice, the first electrospindle 11 and the cutting disc 35 are rotatable with respect to the supporting body 33 about the axis R (the supporting body 33, on the other hand, does not rotate about the same axis or direction of rotation R).

In the preferred embodiment illustrated, the supporting body 33 is in turn preferably fixed to the mobile part 31b of the gear motor 31 supported in the lower part of the supporting equipment 12 and with which it is rotationally integral about the axis Z.

In this way, it is advantageously possible to have a precise movement of the supporting body 33 and of the first electrospindle 11 supported by the same (and further rotatably mounted thereon) about the axis Z (rotation axis W) so as to achieve the desired cutting direction.

In the preferred embodiment illustrated in the figures, the machine 1 comprises a motor 37 configured to move the first electrospindle 11 about the rotation axis R to vary the angle of inclination of the electrospindle 11 with respect to a plane perpendicular to the working plane 2 on which the slab material 3 to be machined is arranged.

In this way, the cutting disc 35 of the first electrospindle 11 can be moved according to an additional direction of movement, indicated in the figures with the double arrow R, to easily make, for example, inclined cuts with respect to the vertical, horizontal cuts, drilling operations when the machining tool is an end mill or edge-shaping of the slab material 3 when the machining tool is a grinder.

Preferably, the cutting disc 35 is at least partially enclosed in a protective casing 38 as shown in the figures.

In the preferred embodiment illustrated, the machine 1 comprises a manipulator group 39 of the slab material 3 to be machined and/or of the pieces 8 obtained therefrom, rotationally and translationally integral with the first electrospindle 11.

In particular, the manipulator group 39 exerts the advantageous function of moving the slab material 3 to be machined and/or the pieces 8 obtained from such material, in particular picking them up from the working plane 2 or repositioning them back thereon according to the operations to be carried out.

Preferably, the manipulator group 39 is arranged in parallel to a cutting plane extending perpendicularly to the working plane 2 and frontally with respect to the first electrospindle 11.

In this way and as will become more clearly apparent hereinafter, the manipulator group 39 is able to move the slab material 3 to be machined and/or the pieces 8 obtained therefrom in an operative configuration of the machine 1 wherein the cutting disc 35 is in a non-operative position.

In a particularly preferred embodiment, the manipulator group 39 is incorporated in, or directly fixed to, the protective casing 38 of the cutting disc 35 driven by the first electrospindle 11.

More preferably, the manipulator group 39 is incorporated in, directly fixed to, a front closing door 44 of the protective casing 38 pivotally mounted on the casing itself (closing door removed in FIG. 5 for clarity).

Preferably, the manipulator group 39 comprises gripping means 40 of the suction type, preferably of the pneumatic type (see in particular FIGS. 2 and 5).

In the preferred embodiment shown in the figures, the gripping means 40 are provided with a plurality of pneumatically-activated suction cups, and can be rotated between an initial non-operative position, wherein the suction cups cannot interact with the slab material 3 independently of the position of the supporting equipment 12 of the first electrospindle 11, and a final operative position, wherein the suction cups may engage the upper surface of the slab material 3 when the supporting equipment 12 of the first electrospindle 11 is lowered along the axis Z towards the slab material 3.

Thanks to this preferred configuration of the manipulator group 39, the gripping means 40 are translationally and rotationally integral with the first electrospindle 11 and are therefore rotatable therewith about the axis R between a first non-operative position and a second operative position.

More particularly, the first non-operative position of the gripping means 40 is preferably vertical, as shown in FIGS. 1, 2, and 7a-7d, and corresponds to a working position of the cutting disc 35 that lies on a cutting plane perpendicular to the upper surface of the slab material 3.

Conversely, the second operative position of the gripping means 40 is preferably horizontal, perpendicular to the cutting plane and parallel to the working plane 2, as shown in FIGS. 5, 7f and 7g, and corresponds to a non-operative position of the cutting disc 35, which lies parallel to the upper surface of the slab material 3.

The rotation of the first electrospindle 11, and therefore of the gripping means 40 may preferably vary between about 0° and about 90°.

Preferably, as is shown in the attached figures, the motor 37 which rotates the first electrospindle 11 about the axis R is at least partially integrated with at least one of the rotation pins.

Preferably, the motor 37 is a brushless motor. Moreover, the motor 37 preferably comprises a reducer (not shown in the figures) preferably with a zero clearance.

Preferably, the suction cups are defined in the gripping means 40 by one or more gaskets which delimit one or more areas on the surface of the closing door 44 of the casing 38 (the surface that can be facing in parallel to the working plane 2 and to the upper surface of the slab material 3 arranged thereon).

Preferably, the areas delimited by the gaskets have a closed perimeter, for example circular, rectangular, or having a different shape.

In the preferred embodiment illustrated and as can be better seen in FIG. 5, the gripping means 40 of the manipulator group 39 preferably comprises four gaskets 41a, 41b, 42a and 42b inserted in respective grooves formed in the material of the closing door 44 of the casing 38. Preferably, the gaskets 41a, 41b, 42a and 42b define corresponding substantially rectangular portions of the surface of the closing door 44 of the casing 38 or of a plate 85 directly associated thereto such as for example schematically shown in the figures.

Preferably, the manipulator group 39 also comprises air suction means (not shown) in fluid communication with the aforementioned portions wherein they are capable of creating a predetermined vacuum degree in a conventional manner, for example by means of a vacuum pump or a Venturi tube.

Preferably, the closing door 44 of the casing 38 and the plate 85 fixed thereto are also provided with a through hole (which in FIG. 5 is visible that, indicated at 43, of the plate 85) or, alternatively, with a cut-off, so as to allow access to the free end of the drive shaft of the electrospindle 11 to replace the cutting disc 35 (when for example worn) and/or to have the possibility of mounting other machining tools thereon, such as for example an end mill (see FIG. 7h) or a grinder replacing or in addition to the cutting disc 35 by means of suitable connecting means conventional per se and not shown.

When the gripping means 40 are in the operative position, and therefore preferably horizontal, and are brought together with the electrospindle 11 by the vertically movable supporting equipment 12 in abutment against the upper surface of the slab material 3, the air suction means are activated so as to generate a depression within the volumes delimited by the slab material 3 and by the gaskets 41*a*, 41*b*, 42*a* and 42*b*.

Preferably, the depression is adjusted to obtain an effective suction effect which allows to lift the slab material 3 along the axis Z together with the first electrospindle 11.

Preferably, the manipulator group 39 further comprises one or more intercepting valves (not shown) of the air flow from and towards the air suction means.

The intercepting valves are preferably solenoid valves and each one of them may be operated independently from the others to cause a depression in just one of the suction cups, for example in the couples of suction cups defined by the gaskets 42*a* and 42*b*, or in all of the suction cups defined by the gaskets 41*a*, 41*b* and 42*a*, 42*b*.

The solenoid valves can be outside of the closing door 44, or alternatively they can be arranged on the same door, in the plate 85, within a housing associated to the door or to the plate, or further on other parts of the casing 38.

In the preferred embodiment illustrated in the attached figures, the machine 1 further comprises a second and a third tool-holder electrospindle, 45, 46, rotationally and translationally integral with the first electrospindle 11 and supported above the working plane 2 in parallel to the first electrospindle 11 by respective supporting arms 47, 48 slidably supported by the supporting body 33 of the first electrospindle 11 associated, as described above, to the supporting equipment 12.

The second electrospindle 45 directly rotates a respective second cutting disc 49 and comprises a motor 50, preferably a liquid-cooled electric motor of very small size.

In a totally similar way, the third electrospindle 46 directly rotates a respective third cutting disc 51 and comprises a motor 52, preferably a liquid-cooled electric motor of very small size.

Preferably, the cutting discs 49 and 51 are at least partially enclosed in respective protective casings 53, 54 as schematically shown in the figures.

Preferably, the second and the third electrospindles 45, 46 are supported by the respective supporting arms 47, 48 at opposite sides with respect to the first electrospindle 11.

In this way, it is advantageously possible to obtain a symmetrical and balanced distribution of the masses involved to the benefit of the operation stability of the machine 1.

As mentioned above, the supporting arms 47, 48 are movable and slidably supported by the supporting body 33 of the first electrospindle 11.

In particular, the supporting arms 47, 48 are sliding with respect to the supporting body 33 along a predetermined direction substantially parallel to the working plane 2.

Preferably, the second and the third electrospindles 45, 46 are fixed at respective free end portions 47', 48' of the supporting arm 47, 48.

In this preferred embodiment, therefore, the second and the third electrospindle 45, 46 are translationally integral with the respective supporting arms 47; 48 along a moving direction of the arms in parallel to the working plane 2.

In particular, the second and the third electrospindle 45, 46 are preferably supported below the respective supporting arm 47, 48 near the free end portion 47', 48' thereof.

In the preferred embodiment illustrated, a housing zone 33' of the supporting arms 47, 48 is defined in the supporting body 33 of the first electrospindle 11.

In particular, the housing zone 33' is preferably defined in a substantially hollow box-shaped portion of the supporting body 33 of the first electrospindle 11.

Preferably, the box-shaped portion of the supporting body 33 is substantially parallelepipedic and is open at two opposed lateral faces, which are crossed by the supporting arms 47, 48 (see in particular FIGS. 5, 5*a*-5*d*).

Preferably, the box-shaped portion of the supporting body 33 therefore comprises a pair of opposite plates, respectively upper 33*a* and lower 33*b*, and a pair of lateral plates 33*c*.

The upper and lower plates 33*a*, 33*b* are connected to the lateral plates 33*c* by means of known fixing means, for example by screws or bolts 33*d*.

In this way, it is advantageously possible to combine adequate characteristics of rigidity and strength of the box-shaped portion of the supporting body 33 and characteristics of reduced weight of the same and consequent constructive simplicity and reduced costs of the machine 1.

Preferably, the supporting arms 47, 48 of the second and third electrospindle 45, 46 are substantially drawer-shaped.

Thanks to this configuration, the supporting arms 47, 48 can be slidably mounted in the housing zone 33' of the supporting body 33 and easily guided therein with a drawer-like sliding as will be illustrated in the following.

Preferably, each of the supporting arms 47, 48 comprises a pair of rod-shaped elements 47*a*, 47*b* and 48*a*, 48*b*.

Preferably, the rod-shaped elements 47*a*, 47*b* of the supporting arm 47 and the rod-shaped elements 48*a*, 48*b* of the supporting arm 48 are fixed to and extend in a cantilevered fashion from a respective substantially vertical plate 86, 87 which closes the free end 47', 48' of each of the supporting arms 47, 48.

Preferably, the rod-shaped elements 47*a*, 47*b*, 48*a*, 48*b* of each supporting arm 47, 48 are supported in parallel and at a predetermined distance from each other by the respective plate 86, 87.

These rod-shaped elements 47*a*, 47*b*, 48*a*, 48*b* are slidably mounted in the housing zone 33' defined in the supporting body 33 of the first electrospindle 11, and in particular in the substantially hollow box-shaped portion of the supporting body 33.

In particular, the rod-shaped elements 47*a*, 47*b*; 48*a*, 48*b* comprise respective sliding guides 47"; 48" which are sliding in blocks 47'''; 48''' preferably fixed to the bottom plate 33*b* of the substantially hollow box-shaped portion of the supporting body 33.

Alternatively, it may be foreseen that the blocks are fixed to the rod-shaped elements 47*a*, 47*b*, 48*a*, 48*b* and that the sliding guides are fixed to the bottom plate 33*b* of the substantially hollow box-shaped portion of the supporting body 33 (i.e. a sliding coupling having a reversed kinematic motion may be provided).

In this way, it is advantageously possible to achieve a guided sliding substantially of a drawer-like type of the supporting arms 47, 48 in the housing zone 33' defined in the supporting body 33.

In the preferred embodiment illustrated, the supporting arms 47, 48 are configured to at least partially interpenetrate with each other in the housing zone 33'.

Preferably, the rod-shaped elements 47*a*, 47*b* of the supporting arm 47 and the rod-shaped elements 48*a*, 48*b* of the supporting arm 48 are suitably laterally offset along the respective sliding plane in such a way as to allow said at least partial mutual interpenetration within the housing zone 33'.

Figure 5C:
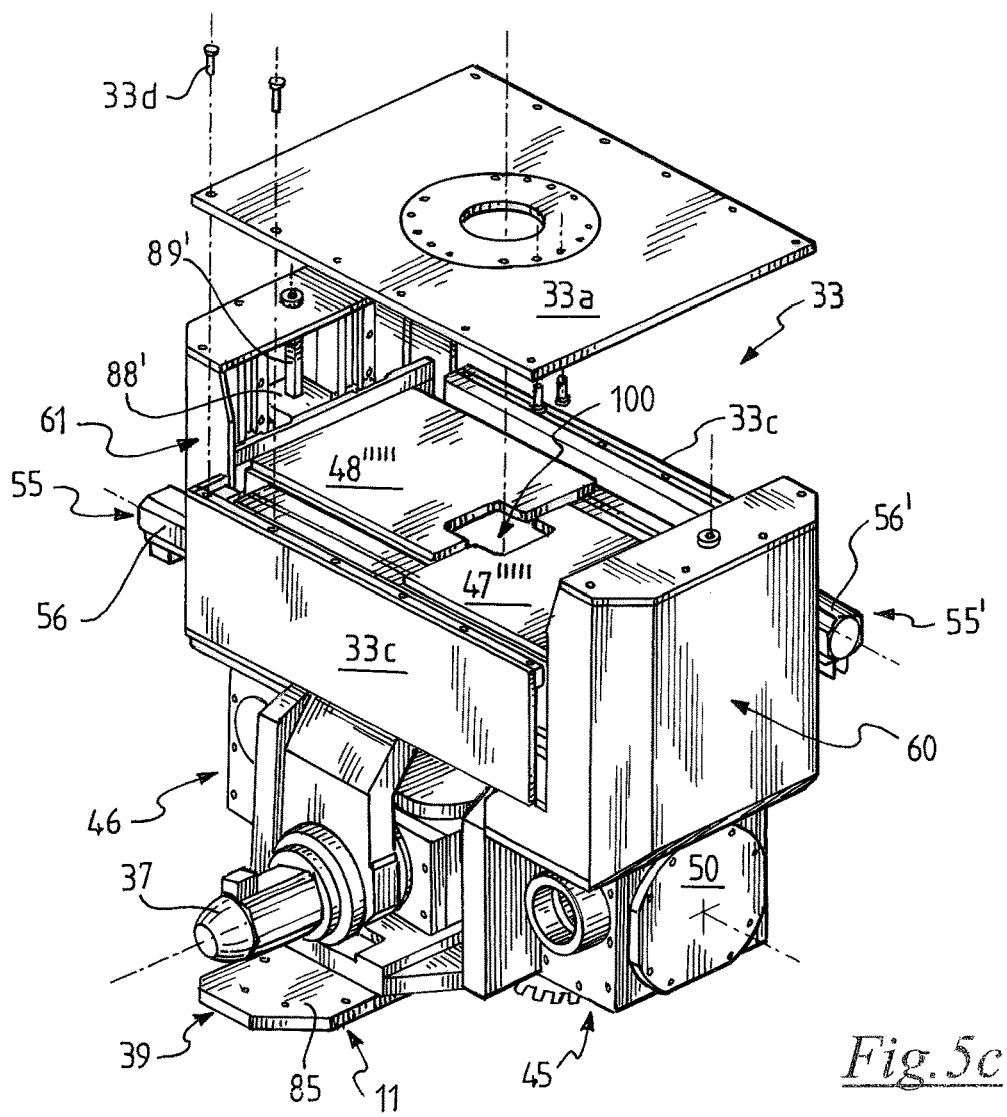
FIG. 5c is a top perspective schematic view, also partially exploded, of a portion of the machine of FIG. 1 in an additional possible operative configuration in which the supporting arms of the lateral electrospindles are completely housed in the supporting body of the central electrospindle.
Figure 5D:
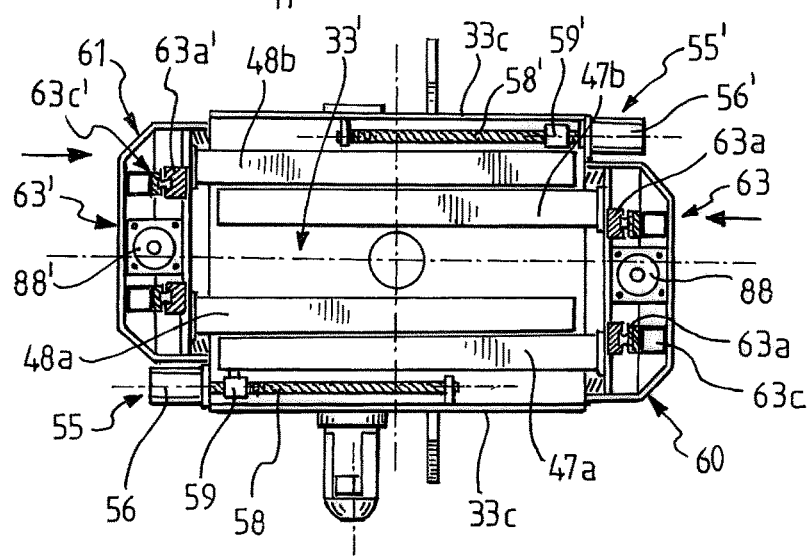
FIG. 5d is a schematic top plan view of some details of the supporting arms of the lateral electrospindles and of the respective actuator devices in the operative configuration of the machine illustrated in FIG. 5c.

In particular, each of the supporting arms 47, 48 is slidable between a first insertion position wherein the arm is substantially completely housed in the housing zone 33' as shown in FIG. 5d, and a second extraction position wherein the supporting arm 47, 48 is at least partially extended in a cantilevered fashion out of the supporting body 33 of the first electrospindle 11 as shown in FIGS. 5a and 5b.

In an alternative embodiment (not shown), the movable supporting arm of the second electrospindle 45 and/or the movable supporting arm of the third electrospindle 46 is substantially telescopic.

Preferably, the rod-shaped elements 47a, 47b and 48a, 48b of the supporting arms 47, 48 are hollow and each of them is preferably formed by a respective elongated box-shaped body, substantially parallelepipedic and having a quadrangular section, as shown in FIGS. 5, 5a-5d.

In this way, the rod-shaped elements 47a, 47b, 48a, 48b are structurally capable to support the weight of the second and of the third electrospindle 45, 46 and also advantageously have a reduced weight and cost to the benefit of the functionality and cost of the machine 1.

In this way, it is also advantageously possible to support all the electrospindles 11, 45 and 46 of the machine 1 with a machine which is structurally simple and of small size and having an improved operational stability thanks to the reduced forces of inertia involved.

Preferably, each of the supporting arms 47, 48 further comprises a plate 47''''; 48'''' fixed above the respective rod-shaped elements 47b, 47a; 48b, 48a.

Advantageously, the plate 47''''; 48'''' allows to stiffen each of the supporting arms 47, 48 closing at the same time the zone defined between the rod-shaped elements 47a, 47b, 48a, 48b.

As is shown in FIG. 5c, when the two arms 47, 48 are arranged in the aforementioned first insertion position in the housing zone 33', respective recesses of the two closure plates 47''''; 48'''' define a through opening 100 for the passage of power supply and cooling lines of the electrospindles 11, 45 and 46.

The machine 1 comprises actuator devices 55, 55' configured to act on the supporting arm 47 and, respectively, on the supporting arm 48 and configured to move independently from each other each of the supporting arms 47, 48 (and, consequently, the additional electrospindles 45 and 46 supported by the same) towards and away from the supporting body 33 of the first electrospindle 11 in parallel to the working plane 2 and along a direction substantially perpendicular to a cutting plane extending perpendicularly to the working plane 2.

In particular, the actuator devices 55, 55' are configured to act on the supporting arms 47, 48 and are configured to insert/extract the respective supporting arm 47, 48 into/from the housing zone 33'.

Preferably, the actuators devices 55 and 55' configured to act on the supporting arms 47, 48 are respectively identical and symmetrical with each other as shown in greater detail in FIGS. 5a-5d.

Making now reference in particular to FIGS. 5a-5d, the machine 1 comprises, for each supporting arm 47, 48 a first actuator device 55, 55' and a second actuator device 63, 63'.

Preferably, the actuator device 55, 55' is a linear actuator, more preferably of the ball screw drive type.

More particularly, the actuator device 55, 55' comprises an electric motor 56, 56' which rotates by means of a geared motor, preferably of the zero-clearance type, a ball screw 58, 58' which is in engagement with a nut screw 59, 59' fixed to the respective supporting arm 47, 48 of the electrospindles 45, 46 (see FIGS. 5a and 5b).

Preferably, the nut screw 59, 59' is arranged at an end portion of the rod-shaped element 47a, 48b which is laterally outermost of each pair of rod-shaped elements 47a, 47b and 48a, 48b of the supporting arms 47; 48 (see FIGS. 5a and 5b).

According to this preferred configuration of the actuator devices 55, 55', each of the ball screws 58, 58' is associated to a respective lateral plate 33c of the box-shaped portion of the supporting body 33 (see FIGS. 5a and 5b).

In the preferred embodiment illustrated and thanks to the laterally offset position of the supporting arms 47, 48 along their sliding plane, it is advantageously possible to arrange the electric motors 56, 56' of the actuator devices 55, 55' laterally to each supporting arm 47, 48 in specific recesses defined between the arms and the lateral faces (defined by the plates 33c) of the box-shaped portion of the supporting body 33 (see FIGS. 5a and 5b).

Thanks to the preferred configuration of the actuator devices 55, 55' described above, it is also advantageously possible to achieve a precise movement along the horizontal direction of the supporting arms 47, 48 of the electrospindles 45, 46 whose movement in parallel to the working plane 2 is preferably and advantageously further guided by the sliding guides 47'', 48'' and by the blocks 47''', 48'''.

The above actuator devices 63, 63' are respectively associated to the supporting arms 47 and 48 and are configured to move each of the additional electrospindles 45 and 46 independently from each other along a direction substantially perpendicular to the working plane 2.

Preferably, the actuator devices 63 and 63' associated to the supporting arms 47, 48 are respectively identical and symmetrical to each other as illustrated in more detail in FIGS. 5a-5d.

Preferably, the actuator devices 63 and 63' are mounted in respective supporting bodies 60, 61 of the electrospindles 45, 46 fixed to the free end 47', 48' of the supporting arms 47, 48 of the electrospindles 45, 46.

In the preferred embodiment illustrated, the supporting bodies 60, 61 of the electrospindles 45, 46 are preferably constituted by respective substantially L-shaped box-shaped bodies, having a lower wall of the L facing towards the supporting body 33 of the first electrospindle 11 and a major wall of the L parallel to the plates 86, 87 of lateral closure of the arms 47, 48.

The electrospindles 45, 46 are mounted below the lower wall of the supporting bodies 60, 61 in a way conventional per se not better shown in the figures.

In the assembled configuration of the electrospindles 45 and 46, the cutting disks 49, 51 are preferably facing towards the supporting body 33 of the first electrospindle 11.

In this way, it is advantageously possible to minimize the distance between the cutting disks 35, 49 and 51 when the supporting arms 47, 48 are fully inserted into the housing zone 33' as illustrated in FIG. 5c.

In the preferred embodiment illustrated and as better shown in FIG. 5a, each of the actuator devices 63, 63' comprises a pneumatic actuator 88, 88'. In this way, it is advantageously possible to move the electrospindles 45 and 46 along a vertical direction towards and away from the slab material 3 by means of a device which is simple to control and inexpensive.

Preferably, the pneumatic actuator 88, 88' is fixed in a way conventional per se to the respective supporting plate 86, 87 closing the supporting arms 47, 48 and comprises a rod 89, 89' having a free end fixed to the respective supporting body 60, 61 of the electrospindles 45, 46.

In a further preferred embodiment, not shown, the actuator device 63 can be an electromechanical actuator, in particular and preferably, a linear actuator. In this way, it is advantageously possible to move the electrospindles 45 and 46 along the vertical direction towards and away from the slab material 3 in a very precise manner if this is required by the machining needs.

In the preferred embodiment illustrated and as better shown in FIG. 5a, each of the actuator devices 63, 63' comprises a pair of blocks 63a, 63a' fixed to the respective supporting plate 86, 87 closing the free end portion 47', 48' of the supporting arms 47, 48.

Preferably, the blocks 63a, 63a' are slidable along guides 63c, 63c' fixed to an inner face of the major wall of the supporting bodies 60, 61 of the electrospindles 45, 46 and vertically arranged in the mounting configuration of the machine 1.

In this way, the second electrospindle 45 and the third electrospindle 46 can be advantageously moved along a direction perpendicular to the working plane 2 independently of each other and independently of the first electrospindle 11 when this is necessary to carry out the desired machining on the slab material 3.

This additional movement of the electrospindles 45, 46 along a direction perpendicular to the working plane 2 is thus independent and additional with respect to the movement—which takes place integrally for the three electrospindles 11, 45 and 46—achieved thanks to the movement along the vertical direction (axis Z) of the supporting equipment 12 of the first electrospindle 11, which equipment is integral with the electrospindles 45 and 46 by means of the supporting arms 47, 48.

Advantageously, the actuator devices 55, 55' and 63, 63' described above are supported by the supporting arms 47, 48 of the electrospindles 45 and 46 and are preferably protected from the outside environment by the substantially hollow box-shaped portion of the supporting body 33 of the electrospindle 11 (except for the motors 56, 56') and by the supporting body 60, 61 of the electrospindles 45 and 46.

It is to be understood that the configuration of the machine 1 illustrated herein is only one of the possible preferred embodiments, so that the aforementioned actuator devices 55, 55' and 63, 63' may also be chosen by a person skilled in the art so as to be different between each other and/or be different from the preferred one described herein merely by way of example and, this, as a function of specific application requirements.

In a preferred embodiment and as better illustrated in FIG. 3, the supporting equipment 12 of the first electrospindle 11 may comprise a braking device 66 configured to prevent relative rotation movements between the part of the supporting equipment 12 not rotatable about the axis Z (the body 22 and the fixed part 31a of the gear motor 31 fixed thereto) and the part of such equipment 12 rotatable about the axis Z (the mobile part 31b of the gear motor 31) and associated to the first electrospindle 11 and, consequently, to the additional electrospindles 45, 46 translationally and rotationally integral therewith.

Advantageously, the braking device 66 substantially completely absorbs the torsion stresses that develop in the case of cuts, for example oblique cuts, carried out with the cutting disc driven by the second 45 or by the third electrospindle 46 and spaced apart with respect to a fulcrum represented by the vertical rotation axis Z of the first electrospindle 11.

In this way, it is advantageously possible to drastically reduce if not substantially eliminate premature wearing phenomena of the gears of the moving device 29, for example of the gear motor 31, used in the machine 1 to rotate both the first electrospindle 11 and the additional electrospindles 45, 46 integral therewith about the vertical axis Z, thereby contributing to ensure the cutting precision of the machine 1 over time.

Preferably, the braking device 66 comprises a pair of superimposed rings 67, 68, respectively upper and lower, coaxially mounted with respect to the fixed upper part 31a and lower mobile part 31b of the gear motor 31 to which they are fixed in a conventional manner, not shown.

In this preferred embodiment, the braking device 66 thus forms part of the actuator device 29 configured to move the first electrospindle 11 about the axis Z perpendicular to the working plane (axis W) and arranged in the lower part of the substantially plate-shaped body 22 of the supporting equipment 12.

Preferably, the braking device 66 is of the depression type, i.e. it carries out its braking action by creating a suitable vacuum degree between facing surfaces 67a, 68a of the superimposed rings 67, 68.

To this end, the upper ring 67 is provided with a plurality of depressions 69 formed at its lower surface 67a each of which is in fluid communication, in a manner conventional per se, not shown, and by means of respective through holes 70, with air suction means (not shown) capable of creating a predetermined vacuum degree, for example by means of a vacuum pump or a Venturi tube, in the volumes defined in the depressions 69 when the rings 67, 68 are in contact with each other.

Preferably, the upper ring 67 is provided with a plurality of additional through holes 71 in fluid communication, in a way conventional per se and not shown, with means for feeding pressurised air, such as for example a compressed air tank or a compressor.

In this way, it is advantageously possible to reduce and substantially eliminate the friction forces between the rings 67, 68 when the supporting body 33 of the electrospindle 11 and the electrospindles 45, 46 associated thereto are rotated about the axis Z (direction W) by feeding pressurised air between the rings 67, 68 by means of the holes 71.

The machine 1 finally comprises an operation and control unit 72 (FIG. 1) equipped with an operator interface. The unit 72 is programmed to control the machine 1 in carrying out the required machining operations on the slab material 3.

With reference to FIGS. 1 to 7g a preferred method for machining slab materials 3 which may be carried out by means of the machine 1 described above will now be described.

The method essentially comprises the step of providing the slab material 3 to be machined on the working plane 2 for example by means of the conveyor belts 4 and 6 and thereafter the step of moving the multi-spindle cutting unit formed by the three electrospindles 11, 45 and 46 associated to the supporting equipment 12 (in this case by means of the supporting body 33 of the first electrospindle 11 and of the supporting arms 47, 48 of the second and of the third electrospindle 45, 46) to carry out a machining operation on the slab material 3.

For example, such a machining operation can consist in obtaining tiles 8 of standard dimensions from the slab material 3.

The movement of the electrospindles 11, 45 and 46 is obtained, according to the direction of movement:

by means of the moving apparatus 14 of the first electrospindle 11, which in the machine 1 of the invention also simultaneously moves the additional electrospindles 45 and 46 translationally integral with the first electrospindle 11, along the directions X and Y, i. e. in parallel to the working plane 2 and to the slab material 3 supported by the same;

by means of the actuator device 23 of the supporting equipment 12 of the first electrospindle 11, along the direction Z, i.e. perpendicularly to the working plane 2 and to the slab material 3 supported by the same;

by means of the actuator device 29 of the first electrospindle 11 (in this case configured to rotate the supporting body 33) about the axis Z perpendicular to the working plane 2 (direction W).

All this according to a work programme stored in the operation and control unit 72.

In a first step and as illustrated in FIG. 7a, the second and the third electrospindle 45 and 46, i.e. the lateral electrospindles, are positioned at the desired distance with respect to the central electrospindle 11 by means of the respective actuator devices 55, 55'.

Thereafter, the multi-spindle cutting unit formed by the three electrospindles 11, 45 and 46 associated to the supporting equipment 12 is firstly lowered by the actuator device 23 until the cutting discs 35, 49 and 51 engage the slab material 3 (as illustrated in FIG. 7b) and then moved by the moving apparatus 14 along the desired cutting direction, for example along the direction Y.

Once this first cut has been made, the multi-spindle cutting unit formed by the three electrospindles 11, 45 and 46 is then lifted and rotated by 90° about the axis Z by means of the actuator device 29 so as to bring the cutting discs 35, 49 and 51 into alignment with a cutting direction perpendicular to the previous one, so as to obtain the tiles 8.

If necessary, it is at this point possible to further adjust the distance between the cutting discs 35, 49 and 51 of the electrospindles 11, 45 and 46 by means of the actuator devices 55, 55'.

Thereafter, the multi-spindle cutting unit formed by the three electrospindles 11, 45 and 46 associated to the supporting equipment 12 is again lowered by the actuator device 23 until the cutting discs 35, 49 and 51 engage the slab material 3 (again as illustrated in FIG. 7b) and then moved by the moving apparatus 14 along the new desired cutting direction, the direction X in this case.

Once the tiles 8 have been obtained, they can be carried away from the working plane 2 by means of the conveyor belt 4 and then sent to other operations or to storage by means of the conveyor belt 7.

Clearly and as foreseen in a conventional cutting machine, it is possible to carry out oblique cuts on the slab material 3 by suitably positioning the assembly formed by the three electrospindles 11, 45 and 46 by means of the actuator device 29 and then operating the moving apparatus 14 so as to have simultaneous movements along the two directions X and Y.

In this way, the machine 1 of the invention is advantageously capable of achieving a high productivity, for example for a large-scale production of pieces of standard dimensions such as for example the tiles 8, whilst still being a machine of great constructive simplicity, which may be controlled substantially like a single-electrospindle cutting machine, and of low cost.

The reduced masses of the additional electrospindles 45 and 46, of the respective supporting arms 47, 48 (having a substantially box-shaped configuration as described above) and of the respective actuator devices 55, 55' and 63, 63', also allow to maintain the cutting precision over time since the stresses applied to the gears of the gear motor 31 of the actuator device 29 are correspondingly reduced.

In the preferred embodiment wherein the braking device 66 is provided, such stresses can be further reduced if not substantially eliminated to the benefit both of the cutting precision over time and of the useful life of the gear motor 31.

In an alternative embodiment and according to the machining specifications, the slab material 3 may be cut using only one or some of the cutting discs 35, 49 and 51 of the three electrospindles 11, 45 and 46 as schematically shown in FIGS. 7c-7d and 7g.

Thus, in the cutting configuration illustrated in FIG. 7c it is possible to use only the cutting discs 35 and 51 of the first and of the third electrospindle 11, 46. In order to do this, it is sufficient to lift the second electrospindle 45 by means of the respective actuator device 63 configured to move the electrospindle 45 perpendicularly to the working plane 2 independently of the remaining electrospindles 11 and 46.

Clearly, it is possible to carry out a similar machining operation with the electrospindles 11 and 45 by lifting the third electrospindle 46 by means of the respective actuator device 63'.

If it is desired to carry out a single cutting operation it is also possible to use a single electrospindle. Preferably and for reasons of practicality and balance of the machine 1, the central electrospindle 11 is used in this case according to the cutting configuration illustrated in FIG. 7d.

In this case, both the second and the third electrospindle 45, 46 are lifted by means of the respective actuator devices 63, 63'.

If it is desired to make a pair of cuts at a relatively large distance, for example comprised between about 70 and about 130 cm, it is also possible to lower only the second and the third electrospindle 45, 46 towards the slab material 3 by means of the respective actuator devices 63, 63' while keeping the cutting disc 35 of the central electrospindle 11 spaced apart from the slab material 3.

In this case and as illustrated in FIG. 7g, it is advantageously possible to obtain this spacing of the cutting disc 35 without lifting the supporting equipment 12 of the first electrospindle 11 by rotating the central electrospindle 11 by 90° about the axis R by means of the motor 37 so as to arrange the respective cutting disc 35 horizontally in a non-operative position.

In this way, it is advantageously possible to have a constant and predetermined travel range of the actuator devices 63, 63' that can in this case be advantageously implemented as pneumatic actuators, which are less expensive but capable of ensuring the positioning precision at only the limit positions according to an on-off type operating mode.

By means of the machine 1 described above it is thus advantageously possible to carry out parallel cuts at the desired distances in a mechanically simple manner so as to obtain a wide range of dimensions of the machined pieces, for example of the tiles 8.

Thus, for example, it is possible to obtain tiles 8 from the slab material 3 having dimensions of from about 20×20 cm up to about 62×62 cm by simultaneously using the three cutting discs 35, 49 and 51 of the three electrospindles 11, 45 and 46; and tiles 8 having dimensions of from 20×20 cm up to 130×130 cm as a function of the two cutting disks simultaneously used, for example the discs 35 and 49 (to achieve the minimum distance between the discs), or the discs 49 and 51 (to achieve the maximum distance between the disks).

In additional preferred embodiments and as outlined above, the machine 1 according to the invention may comprise a number of additional electrospindles rotationally and translationally integral with the first electrospindle 11 greater than two as a function of the specific application requirements aimed at increasing the productivity of the machine for large-scale productions.

The number of additional electrospindles can thus vary from two to eight or more according to configurations having from three to nine or more electrospindles in total.

When the additional electrospindles are more than two in number, as in the preferred embodiments illustrated in the figures, it is foreseen that these additional electrospindles are preferably configured in a manner similar to the electrospindles 45 and 46 and that they are preferably equipped with respective actuator devices and mechanisms for their movement along a direction parallel to the working plane 2 and along a direction perpendicular to such a plane totally analogous to those described above with reference to the attached figures.

Thus, for example, also in these additional preferred embodiments of the invention the supporting arms of a third (fourth electrospindle of the machine 1) and of any possible subsequent electrospindles additional to the first three ones described above, are slidably supported by the supporting body 33 of the first electrospindle 11, for example externally to thereto.

In a possible preferred embodiment, the supporting arms of these further additional electrospindles may include, each, a pair of rod-shaped elements entirely similar to the rod-shaped elements 47a, 47b, and 48a, 48b described above.

In this preferred embodiment, the rod-shaped elements of the further additional electrospindles are preferably parallel to each other and are slidably supported externally to the supporting body 33 at opposite sides thereof.

In a preferred configuration of the machine 1 having five electrospindles in total, the rod-shaped elements of the fourth and of the fifth electrospindle are preferably supported in alignment with each other (i.e. without mutual interpenetration as in the case of the electrospindles 45 and 46).

Preferably, all the further electrospindles in addition to the electrospindles 45 and 46 of the machine 1 are moved towards and away from the first electrospindle and along a direction perpendicular to the working plane by means of respective actuator devices, configured to act on their respective supporting arms, entirely similar to those described with reference to the preferred embodiment having three electrospindles in total (two additional electrospindles 45 and 46).

The preferred features described above with reference to the preferred embodiment having three electrospindles in total (two additional electrospindles 45 and 46), are also equally applicable to machine configurations having four or more electrospindles in total.

Within the framework of the single cutting modes, the machine 1 according to the invention is also capable of carrying out cuts of the slab material 3 according to directions inclined with respect to the vertical one in a very simple manner.

This type of cut may be advantageously carried out in manners similar to those of the known cutting machines provided with a single electrospindle by rotating the central electrospindle 11 and the cutting disc 35 about the axis R by means of the motor 37 so as to obtain the desired inclination as schematically illustrated in FIG. 7e.

The machine 1 of the invention also advantageously allows to carry out a machining method further comprising the step of modifying the position of the slab material 3 on the working plane 2, i.e. the step of repositioning the slab material or the pieces 8 obtained therefrom.

This step is carried out by means of the manipulator group 39.

Thus, for example, when it becomes necessary to reposition the slab material 3 as illustrated in FIG. 7f, the operation and control unit 72 activates the manipulator group 39, which in the cutting configuration of the machine 1 is in the non-operative position shown in FIGS. 2 and 7a-7d.

Such an activation takes place with the electrospindle 11 lifted with respect to the slab material 3 so that the manipulator group 39 and the respective gripping means 40 are vertically arranged and cannot come into contact with the slab material 3.

Specifically, the operation and control unit 72 rotates, by means of the motor 37, the first electrospindle 11 between an operative position, wherein the cutting disc 35 can interact with the slab material 3 and the manipulator group 39 is in a respective first non-operative position distal with respect to the working plane 2, and a second non-operative position, wherein the cutting disc 35 cannot interact with the slab material 3 and the manipulator group 39 is in a second operative position proximal with respect to the working plane 2.

At this point, the manipulator group 39 (translationally integral with the first electrospindle 11) is lowered by means of the actuator device 23 until it comes in contact with the slab material 3 (or with a tile 8) to be moved at least partially compressing the gaskets 41a, 41b, 42a and 42b as schematically illustrated in FIG. 7f.

The operation and control unit 72 opens the intercepting valves of the ducts for the fluid connection with the suction means to create the depression necessary to obtain a suction effect that is effective with respect to the weight of the slab material 3.

In this configuration, the slab material 3 (or, if applicable, the tile 8) remains attached to the gripping means 40 by means of the effect of the depression and can be moved by the moving apparatus 14, by the actuator device 23 and by the actuator device 29 into the new position foreseen based on the coordinates X, Y and Z and based on the rotation about the axis Z (axis W) programmed in the unit 72.

Advantageously, and if desired, it is also possible—by implementing a reverse rotation of the first electrospindle 11 by means of the motor 37 and by keeping activated the manipulator unit 39—to rotate the slab material connected to the manipulator group 39 into a substantially vertical position so that the slab material may be placed in such a position in a storage device of the machined workpieces (not shown) positioned aside of the machine 1.

When the repositioning of the slab material 3 (tile 8) has been completed, the control unit 72 closes the intercepting valves and supplies compressed air towards the suction cups of the gripping means 40 so as to obtain the pressure recovery in the suction cups and the release of the slab material 3 (tile 8).

The gripping means 40 are now released from the slab material 3 (tile 8) and the manipulator group 39 can be moved away therefrom and deactivated.

The deactivation of the manipulator group 39 may comprise another rotation about the axis R to bring the gripping means 40 back into the initial non-operative position described above and at the same time reposition the cutting disc 35 back into its operative position ready for use.

Advantageously, the repositioning of the slab material 3 or of the tiles 8 is obtained without any additional calculation burden for the control unit 72, by simply exploiting the same reference system X, Y, Z, W and R and the respective algorithms and without the need to have an independent structure for supporting the manipulator group 39 as is provided on the contrary in the machines with a plurality of cutting groups of the prior art illustrated above.

In a preferred embodiment of the invention and as illustrated in FIG. 7h, the machining tool driven by the first electrospindle 11 can be an end mill 73 so as to carry out drilling operations on the slab material 3.

In this case, the working configuration of the first electrospindle 11 is the configuration illustrated in FIG. 7h, i.e. with the first electrospindle 11 rotated so as to arrange the cutting disc 35 (which can also be previously dismounted) in its horizontal non-operative position and the end mill 73 in its vertical operative position.

Alternatively, it is possible to use a grinder (not illustrated) so as to carry out for example machining operations on the edges of the slab material 3.

Clearly, a person skilled in the art can bring numerous modifications and variants to the machine and to the method for machining slab materials described above, in order to satisfy specific and contingent requirements, all of which are in any case encompassed by the scope of protection of the present invention as defined by the following claims.

The invention claimed is:

1. A machine for machining slab materials comprising:
a working plane configured to support a slab material to be machined; a first tool-holder electrospindle associated to and supported by a respective supporting body, the first electrospindle and the respective supporting body being supported above said working plane by a respective supporting equipment perpendicularly movable with respect to the working plane and configured to move the first electrospindle and the respective supporting body about a rotation axis perpendicular to the workingplane;
a moving apparatus configured to move the supporting equipment in parallel to the working plane and along directions perpendicular to one another;
a second tool-holder electrospindle, translationally movable with respect to the supporting body of the first tool-holder electrospindle, supported above saidworking plane and in parallel to the first electrospindle by a first supporting arm that supports the second tool-holder electrospindle, said first supporting arm being slidably supported by the supporting body of the first electrospindle;
a first actuator device configured to act on the first supporting arm of the secondtool-holder electrospindle to move said first supporting arm and said second tool-holder electrospindle supported by the first supporting arm towards and away from said supporting body of the first tool-holder electrospindle in parallel to said working plane and along a direction perpendicular to a laying plane of a machining tool associated to the second tool-holder electrospindle and extending perpendicularly to the working plane;
a second actuator device associated to said first supporting arm of said second tool-holder electrospindle and configured to move said second tool-holder electrospindle along a direction perpendicular to the working plane independently of the first tool-holder electrospindle;
a third tool-holder electrospindle, translationally movable with respect to the supporting body of the first tool-holder electrospindle, supported above said working plane and in parallel to the first tool-holder electrospindle by a second supporting arm that supports the third tool-holder electrospindle, said second supporting arm being slidably supported by the supporting body of the first tool-holder electro spindle;
a third actuator device configured to act on the second supporting arm of the third tool-holder electrospindle to move said second supporting arm and said third tool-holder electrospindle supported by the second supporting arm towards and away from said supporting body of the first tool-holder electrospindle in parallel to said working plane and along a direction perpendicular to a laying plane of a machining tool associated to the third tool-holder electrospindle and extending perpendicularly to the working plane; and
wherein a housing zone of the first supporting arm and of the second supporting arm of said second and third tool-holder electrospindles is within the supporting body of the first tool-holder electrospindle, and wherein the first actuator device and the third actuator device are configured to insert and respectively extract the respective first supporting arm and second supporting arm into/from said housing zone.

2. The machine according to claim 1, wherein said housing zone of the first supporting arm of said second tool-holder electrospindle is defined in a hollow box-shaped portion of the supporting body of the first tool-holder electro spindle.

3. The machine according to claim 1, wherein the first actuator device is configured to move the first supporting arm of said second tool-holder electrospindle along said direction perpendicular to the laying plane of the machining tool associated to the second tool-holder electrospindle and extending perpendicularly to the working plane between:
a first insertion position wherein the first supporting arm of said second tool-holder electrospindle is completely housed within said housing zone defined in the supporting body of the first tool-holder electrospindle; and
a second extraction position wherein the first supporting arm of said second tool-holder electrospindle is at least partially extending in a cantilevered fashion out of the supporting body of the first tool-holder electrospindle.

4. The machine according to claim 1, wherein said third tool-holder electrospindle is supported above said working plane at a side opposite to said second tool-holder electrospindle.

5. The machine according to claim 1, further comprising:
a fourth actuator device associated to the second supporting arm of said third tool-holder electrospindle and configured to move said third tool-holder electrospindle along a direction perpendicular to the working plane independently of the first and optionally of said second tool-holder electrospindle.

6. The machine according to claim 1, wherein said housing zone of the second supporting arm of said third tool-holder electrospindle is defined in a hollow box-shaped portion of the supporting body of the first tool-holder electrospindle.

7. The machine according to claim 1, wherein the third actuator device is configured to move said second supporting arm of said third tool-holder electrospindle along said direction perpendicular to the laying plane of the machining tool associated to the third tool-holder electrospindle and extending perpendicularly to the working plane between:
a first insertion position wherein the second supporting arm of said third tool-holder electrospindle is completely housed within said housing zone defined in the supporting body of the first tool-holder electro spindle; and a second extraction position wherein the second supporting arm of said third tool-holder electrospindle is at least partially extending in a cantilevered fashion out of the supporting body of the first tool-holder electrospindle.

8. The machine according to claim 1, wherein the first supporting arm of said second tool-holder electrospindle is drawer-shaped.

9. The machine according to claim 1, wherein the first supporting arm of said second tool-holder electrospindle comprises at least one rod-shaped element slidably mounted in said housing zone defined in the supporting body of the first tool-holder electro spindle.

10. The machine according to claim 9, wherein the first supporting arm of said second tool-holder electrospindle comprises a pair of rod-shaped elements parallel to each other.

11. The machine according to claim 1, wherein the second supporting arm of said third tool-holder electrospindle is drawer-shaped.

12. The machine according to claim 1, wherein the second supporting arm of said third tool-holder electrospindle comprises at least one rod-shaped element slidably mounted in said housing zone defined in the supporting body of the first tool-holder electrospindle.

13. The machine according to claim 12, wherein the second supporting arm of said third tool-holder electrospindle comprises a pair of rod-shaped elements parallel to each other.

14. The machine according to claim 1, wherein the movable first and second supporting arms of said second and of said third tool-holder electrospindles at least partially interpenetrate with each other in the housing zone defined in the supporting body of the first tool-holder electrospindle.

15. The machine according to claim 1, wherein the first supporting arm of said second tool-holder electrospindle is slidably supported externally to the supporting body of the first tool-holder electro spindle.

16. The machine according to claim 15, wherein the first supporting arm of said second tool-holder electrospindle comprises at least one rod-shaped element slidably mounted externally to the supporting body of the first tool-holder electro spindle.

17. The machine according to claim 1, wherein the second supporting arm of said third tool-holder electrospindle is slidably supported externally to the supporting body of the first tool-holder electro spindle.

18. The machine according to claim 17, wherein the second supporting arm of said third tool-holder electrospindle comprises at least one rod-shaped element slidably mounted externally to the supporting body of the first tool-holder electro spindle.

19. The machine according to claim 1, wherein said second tool-holder electrospindle is translationally integral with the respective first supporting arm along a moving direction of the arm in parallel to the working plane.

20. The machine according to claim 1, wherein said third tool-holder electrospindle is translationally integral with the respective second supporting arm along a moving direction of the arm in parallel to the working plane.

21. The machine according to claim 1, wherein said second tool-holder electrospindle is supported below the respective first supporting arm near one of the free end portions of the first supporting arm.

22. The machine according to claim 1, wherein said third tool-holder electrospindle is supported below the respective second supporting arm near one of the free end portions of the second supporting arm.

23. The machine according to claim 1, wherein the supporting body of the first tool-holder electrospindle is fixed to an end of the supporting equipment of the first tool-holder electrospindle proximal to the working plane and wherein the first tool-holder electrospindle is pivotally connected to said supporting body.

24. The machine according to claim 1, comprising a manipulator group of a slab material to be machined or machined, rotationally and translationally integral with said first tool-holder electrospindle.

25. The machine according to claim 24, wherein said manipulator group is positioned in parallel to a laying plane of a machining tool associated to the first tool-holder electrospindle, and frontally with respect to said first tool-holder electrospindle.

* * * * *